(12) United States Patent
Kaner et al.

(10) Patent No.: US 8,431,102 B2
(45) Date of Patent: Apr. 30, 2013

(54) RHENIUM BORIDE COMPOUNDS AND USES THEREOF

(75) Inventors: Richard B. Kaner, Pacific Palisades, CA (US); Sarah H. Tolbert, Encino, CA (US); Abby Kavner, Santa Monica, CA (US); Jenn-Ming Yang, Encino, CA (US); Michelle B. Weinberger, Kensington, MD (US); Robert W. Cumberland, Malibu, CA (US); John J. Gilman, Los Angeles, CA (US); Hsiu-Ying Chung, Pingtung (TW); Jonathan B. Levine, Los Angeles, CA (US)

(73) Assignee: The Regents of the University of California, Oakland, CA (US)

( * ) Notice: Subject to any disclaimer, the term of this patent is extended or adjusted under 35 U.S.C. 154(b) by 224 days.

(21) Appl. No.: 12/423,949

(22) Filed: Apr. 15, 2009

(65) Prior Publication Data
US 2009/0274897 A1 Nov. 5, 2009

Related U.S. Application Data

(60) Provisional application No. 61/045,534, filed on Apr. 16, 2008.

(51) Int. Cl.
*C01B 35/02* (2006.01)
*B32B 5/16* (2006.01)
*B32B 9/00* (2006.01)
*C09K 3/14* (2006.01)

(52) U.S. Cl.
USPC ........... 423/289; 428/328; 428/332; 428/402; 428/627; 428/704; 51/307

(58) Field of Classification Search ........................ None
See application file for complete search history.

(56) References Cited

U.S. PATENT DOCUMENTS

| | | | | |
|---|---|---|---|---|
| 4,246,027 | A * | 1/1981 | Watanabe et al. | 75/244 |
| 7,189,431 | B2 * | 3/2007 | Yamasaki et al. | 427/250 |
| 7,645,308 | B2 * | 1/2010 | Kaner et al. | 51/309 |
| 2002/0069592 | A1 * | 6/2002 | Sherman et al. | 51/309 |
| 2005/0180917 | A1 * | 8/2005 | Patel | 424/1.11 |
| 2007/0224100 | A1 * | 9/2007 | Kaner et al. | 423/276 |
| 2009/0003123 | A1 * | 1/2009 | Morrison et al. | 366/76.1 |
| 2009/0274897 | A1 * | 11/2009 | Kaner et al. | 428/328 |

FOREIGN PATENT DOCUMENTS

| JP | 1074419 | * 3/1998 |
|---|---|---|
| WO | WO2005110924 | * 11/2005 |

OTHER PUBLICATIONS

Meschel et al. Metallurgical Transactions A vol. 24A, Apr. 1993 pp. 947-950.*
Hao et al. Physical Review B 74, 2006 p. 1-5.*
J. B. Levine. Synthesis and characterization of ultra-incompressible superhard borides, 2008, 106-126.*
La Placa et al. Acta Crystallographica, 1962, 15, 97.*

(Continued)

*Primary Examiner* — Vera Katz
(74) *Attorney, Agent, or Firm* — Foley & Lardner LLP

(57) ABSTRACT

Described herein are rhenium boride compounds having desirable characteristics for a variety of applications, ranging from abrasives and cutting tools to protective coatings.

6 Claims, 12 Drawing Sheets

OTHER PUBLICATIONS

Chung et al., "Correlation Between Hardness and Elastic Moduli of the Ulatraincompressible Transition Metal Diborides RuB2, OsB2, and ReB2," Applied Physics Letters, (2008) vol. 92, 261904, 3 pages.

Chung et al., "Response to Comment on "Synthesis of Ultra-Incompressible Superhard Rhenium Diboride at Ambient Pressure"," Science, (2007) vol. 318, 1550d, 2 pages.

Chung et al., "Synthesis of Ultra-Incompressible Superhard Rhenium Diboride at Ambient Pressure," Science, (2007) 316:436-439.

Dubrovinskaia et al., "Comment on "Synthesis of Ultra-Incompressible Superhard Rhenium Diboride at Ambient Pressure"," Science, (2007) vol. 318, 1550c, 2 pages.

Koehler of el., "Elastic Moduli of Superhard Rhenium Diboride", J. Phys. D: Appl. Phys., (2009) vol. 42, 095414, 4 pages.

Latini et al., "Superhard Rhenium Diboride Films: Preparation and Characterization," Chem. Mater., (2008) vol. 20:4507-4511.

Levine et al., "Preparation and Properties of Metallic, Superhard Rhenium Diboride Crystals," J. Am. Chem. Soc., (2008) 130(50):16953-16958.

Locci et al., "Reactive Spark Plasma Sintering of Rhenium Diboride," Ceramics International, 2009) 35:397-400.

Qin et al., "Is Rhenium Diboride a Superhard Material?", Adv. Mater, (2008) 20:4780-4783.

Wang et al., "Thermal Equation of State of Rhenium Diboride by High Pressure-Temperature Synchrotron X-ray Studies," Physical Review B, (2008) vol. 78, 224106, 5 pages.

\* cited by examiner

US 8,431,102 B2

RHENIUM BORIDE COMPOUNDS AND USES THEREOF

CROSS REFERENCE TO RELATED APPLICATION

This application claims the benefit of U.S. Provisional Application Ser. No. 61/045,534, filed on Apr. 16, 2008, the disclosure of which is incorporated herein by reference in it entirety.

STATEMENT REGARDING FEDERALLY SPONSORED RESEARCH OR DEVELOPMENT

This invention was made with Government support of Grant No. DMR0453121, awarded by the National Science Foundation. The Government has certain rights in this invention.

FIELD OF THE INVENTION

The invention relates generally to rhenium boride compounds. More particularly, the invention relates to rhenium boride compounds having desirable characteristics for a variety of applications, ranging from abrasives and cutting tools to protective coatings.

BACKGROUND

The design of hard and superhard materials is motivated by a demand for robust, chemically diverse compounds for industrial applications ranging from abrasives and cutting tools to protective coatings. Although diamond, with the highest known hardness of about 70 GPa to about 100 GPa, has traditionally been used to fulfill many of these applications, there are limitations to its use. For example, diamond is typically not used to cut steel and other ferrous metals because of the detrimental formation of iron carbide during high-speed machining. Therefore, there continues to be a quest for synthetic materials that can be used in place of diamond. Cubic boron nitride (or BN), with the second highest known hardness of about 45 GPa to about 50 GPa, is typically used to cut steel. However, synthesis of cubic BN is often carried out under extreme pressures greater than about 5 GPa and extreme temperatures greater than about 1500° C., rendering cubic BN cost-prohibitive for certain applications. Two other compounds have been synthesized recently, namely $B_6O$ and cubic $BC_2N$, which rival the hardness of cubic BN. However, their syntheses also typically involve extreme pressures, exceeding about 5 GPa for $B_6O$ and about 18 GPa for $BC_2N$.

It is against this background that a need arose to develop the rhenium boride compounds and related tools, articles, and methods described herein.

SUMMARY

One aspect of the invention relates to a tool for abrading, cutting, or polishing. In one embodiment, the tool includes a portion including a rhenium boride compound having the formula: $ReB_x$, wherein x is in the range of 1.7 to 2.3.

Another aspect of the invention relates to an article. In one embodiment, the article includes a first layer and a second layer adjacent to the first layer. The second layer includes a rhenium boride compound having a Vickers hardness, at a load of 0.49 N, in the range of 30 GPa to 55 GPa, a Young's modulus in the range of 675 GPa to 755 GPa, and a shear modulus in the range of 215 GPa to 320 GPa.

Other aspects and embodiments of the invention are also contemplated. The foregoing summary and the following detailed description are not meant to restrict the invention to any particular embodiment but are merely meant to describe some embodiments of the invention.

BRIEF DESCRIPTION OF THE DRAWINGS

For a better understanding of the nature and objects of some embodiments of the invention, reference should be made to the following detailed description taken in conjunction with the accompanying drawings.

DETAILED DESCRIPTION

Definitions

Figure 1:
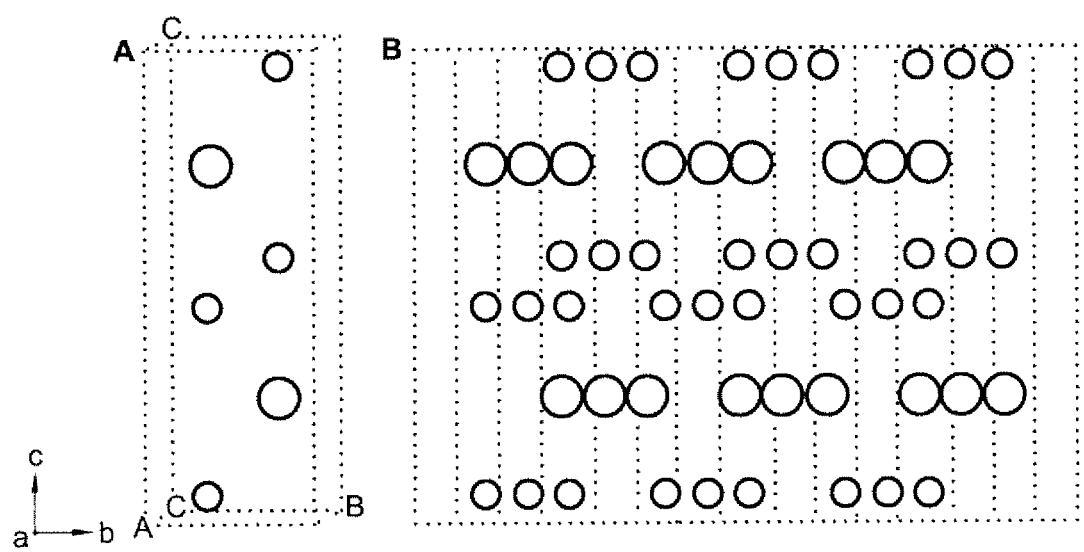
FIG. 1 illustrates a structure of rhenium diboride, according to an embodiment of the invention.

The following definitions apply to some of the aspects described with respect to some embodiments of the invention. These definitions may likewise be expanded upon herein.

As used herein, the singular terms "a," "an," and "the" include plural referents unless the context clearly dictates otherwise. Thus, for example, reference to an object can include multiple objects unless the context clearly dictates otherwise.

As used herein, the term "set" refers to a collection of one or more objects. Thus, for example, a set of objects can include a single object or multiple objects. Objects of a set also can be referred to as members of the set. Objects of a set can be the same or different. In some instances, objects of a set can share one or more common characteristics.

As used herein, the term "adjacent" refers to being near or adjoining. Adjacent objects can be spaced apart from one another or can be in actual or direct contact with one another. In some instances, adjacent objects can be coupled to one another or can be formed integrally with one another.

As used herein, the terms "substantially" and "substantial" refer to a considerable degree or extent. When used in conjunction with an event or circumstance, the terms can refer to instances in which the event or circumstance occurs precisely as well as instances in which the event or circumstance occurs to a close approximation, such as accounting for typical tolerance levels or variability of the embodiments described herein.

As used herein, the terms "optional" and "optionally" mean that the subsequently described event or circumstance may or may not occur and that the description includes instances where the event or circumstance occurs and instances in which it does not.

As used herein, the term "size" refers to a characteristic dimension of an object. Thus, for example, a size of an object that is a spherical can refer to a diameter of the object. In the case of an object that is non-spherical, a size of the object can refer to an average of various orthogonal dimensions of the object. Thus, for example, a size of an object that is a spheroidal can refer to an average of a major axis and a minor axis of the object. When referring to a set of objects as having a specific size, it is contemplated that the objects can have a distribution of sizes around the specific size. Thus, as used herein, a size of a set of objects can refer to a typical size of a distribution of sizes, such as an average size, a median size, or a peak size.

Rhenium Boride Compounds

Embodiments of the invention relate to the design of hard and superhard materials by optimizing two design parameters: high valence-electron density and high bond covalency. High valence-electron densities can be found among the later transition metals, such as rhenium (or Re), osmium (or Os), iridium (or Ir), rhodium (or Rh), ruthenium (or Ru), tungsten (or W), and molybdenum (or Mo), whereas small first-row main-group elements, such as boron (or B), carbon (or C), and nitrogen (or N), form the strongest covalent bonds. Among the transition metals, rhenium metal has a particularly high valence-electron density of about 0.4761 electrons/Å$^3$ and a bulk modulus of about 360 GPa that approaches that of diamond at about 442 GPa. Despite being highly incompressible, the hardness of rhenium metal is relatively low, between about 1.3 GPa and about 3.2 GPa. This low hardness can be explained by the delocalized, non-directional metallic bonding in rhenium versus the short, highly covalent, directional bonds formed by sp$^3$ hybridized carbon atoms in diamond. The strength and directionality of covalent bonds can limit the formation and propagation of defects, which, in turn, causes diamond to resist plastic deformation and results in its exceptional hardness.

By optimizing valence-electron density and covalent bonding, the current approach relates to the design, synthesis, and characterization of ultra-incompressible, highly hard rhenium boride compounds, which include rhenium and boron alone or in combination with other elements. For certain embodiments, the rhenium boride compounds include rhenium diborides having the formula:

$$MB_x \qquad (I)$$

where M is rhenium, and x is in the range of about 1.7 to about 2.3, such as from about 1.8 to about 2.2 or from about 1.85 to about 2. It is contemplated that x can take on a particular integer or a particular fractional value within these specified ranges, and that x can take on other values outside of these specified ranges, such as a particular value greater than about 2.3 to increase the boron concentration and enhance the degree of covalent bonding. It is also contemplated that M in formula (I) can be more generally represented as Re$_y$M'$_{y'}$ or Re$_y$M'$_{y'}$M''$_{y''}$, where M' and M'' are independently selected from transition metals other than rhenium, such as osmium, iridium, rhodium, ruthenium, tungsten, and molybdenum, y is in the range of about 0.01 to about 0.99, and the sum of y and y' or the sum of y, y', and y'' can be equal to 1. It is further contemplated that other elements can be optionally included, such as in amounts that are less than about 5 percent or less than about 1 percent in terms of elemental or atomic composition, and can derive from precursors or other reagents used during synthesis.

Incorporating boron into interstitial sites of rhenium to form rhenium diboride can yield no more than about 5 percent expansion of the original rhenium lattice. This low expansion results in particularly short metal-metal bonds versus other transition metal diborides. In contrast, the lattice of osmium can expand by about 10 percent upon incorporation of boron atoms to form osmium diboride, and the lattice can also undergo a distortion to an orthorhombic phase. Rhenium diboride has the highest B:Re ratio among the Re$_y$B$_x$ phases including Re$_3$B, Re$_7$B$_3$, and ReB$_2$, and therefore has the greatest degree of covalent bonding. The structure of the ReB$_2$ phase is illustrated in FIG. 1, and includes alternating layers of hexagonal close-packed rhenium atoms and puckered hexagonal networks of boron atoms. The resulting structure is one that is layered substantially perpendicular to the c axis along the (001) planes. FIG. 1A illustrates a single unit cell, with the small spheres representing boron atoms and the large spheres representing rhenium atoms, and FIG. 1B illustrates multiple unit cells within the layered structure. Because of its reduced lattice expansion, rhenium diboride can have particularly strong covalent boron-boron and rhenium-boron bonds, relative to other transition metal diborides.

Advantageously, rhenium diborides according to formula (I) can have a number of desirable mechanical characteristics for industrial applications, such as a high hardness, a high bulk modulus, a high Young's modulus, a high shear modulus, the ability to support a high differential stress, and a high density. As can be appreciated, a hardness of a material typically refers to its ability to resist plastic deformation, which can involve substantially irreversible motion of atoms with respect to each other via the formation and movement of dislocations. The hardness of the material can be characterized according to micro-indentation or nano-indentation measurements, and can sometimes vary with respect to an applied load during the measurements. A bulk modulus of a material typically refers to its ability to elastically resist volume compression, while a Young's modulus of the material typically refers to its ability to elastically resist linear compression, such as along a direction of an applied load. A shear modulus of a material typically refers to its ability to elastically resist deformation in a direction different from that of an applied load and, therefore, to elastically resist shape change. A differential stress of a material typically refers to a difference in strain between a minimum stress direction and a maximum stress direction, and a greater amount of differential stress supported by the material without plastic deformation typically translates into a greater ability to resist plastic deformation. In addition to desirable mechanical characteristics, rhenium diborides according to formula (I) can have a number of other desirable characteristics for industrial applications, such as being highly inert and highly resistant to thermal degradation.

For example, in terms of hardness according to micro-indentation measurements, rhenium diborides according to formula (I) can have a Vickers hardness at low loads of about 0.49 N that is at least about 25 GPa, such as at least about 30 GPa or at least about 35 GPa, and up to about 55 GPa or more, such as up to about 50 GPa or up to about 45 GPa. At high loads of about 4.9 N, the Vickers hardness can be at least about 10 GPa, such as at least about 15 GPa or at least about 18 GPa, and up to about 35 GPa or more, such as up to about 33 GPa or up to about 30 GPa. In terms of elastic moduli, the rhenium diborides can have a bulk modulus that is at least about 340 GPa, such as at least about 350 GPa or at least about 355 GPa, and up to about 380 GPa or more, such as up to about 375 GPa or up to about 370 GPa. Also, the rhenium diborides can have a Young's modulus that is at least about 670 GPa, such as at least about 675 GPa or at least about 680 GPa, and up to about 755 GPa or more, such as up to about 750 GPa or up to about 745 GPa, and can have a shear modulus that is at least about 210 GPa, such as at least about 215 GPa or at least about 220 GPa, and up to about 320 GPa or more, such as up to about 300 GPa or up to about 280 GPa. Moreover, at a pressure of about 14 GPa, the rhenium diborides can support a differential stress that is at least about 8 GPa, such as at least about 9 GPa or at least about 10 GPa, and up to about 18 GPa or more, such as up to about 17 GPa or up to about 16 GPa. Furthermore, the rhenium diborides can have a density that is at least about 10 g cm$^{-3}$, such as at least about 11 g cm$^{-3}$ or at least about 11.5 g cm$^{-3}$, and up to a full density of about 12.67 g cm$^{-3}$, such as up to about 12.6 g cm$^{-3}$ or up to about 12.5 g cm$^{-3}$. It should be recognized that values for certain of the mechanical characteristics set forth above can sometimes depend on a direction of an applied load relative to lattice directions. Accordingly, if applicable and unless otherwise specified, values for the mechanical characteristics can be averaged over the lattice directions. Also, unless otherwise specified, values for the mechanical characteristics can be those applicable at room temperature.

Rhenium diborides according to formula (I) can be synthesized using different techniques, including solid-state metathesis, arc-melting, aluminum flux, elemental reactions, Spark Plasma Sintering ("SPS"), and Tri-arc. Advantageously, certain of these techniques can be carried out at ambient pressure or at other pressures substantially lower than the extreme pressures used for the synthesis of other hard and superhard materials. Depending on a particular technique used, a resulting rhenium diboride can be polycrystalline or can be in a single crystal form. In particular, an aluminum flux reaction can be used to form rhenium diboride in a single crystal form, while other techniques, such as solid-state metathesis, arc-melting, elemental reactions, and SPS, can be used to form rhenium diboride in a polycrystalline form. Polycrystalline rhenium diboride can have a crystallite or grain size in the range of about 1 nm to about 100 nm, such as from about 5 nm to about 100 nm, from about 10 nm to about 50 nm, or from about 10 nm to about 25 nm. In some instances and depending on the crystallite size, polycrystalline rhenium diboride can have enhanced mechanical characteristics relative to rhenium diboride in a single crystal form, as a result of the Hall-Petch effect.

For example, $ReCl_3$ and $MgB_2$ can be used as precursors for a solid-state metathesis reaction. The reaction can be carried out using a 2:3 molar mixture of $ReCl_3:MgB_2$, and can be initiated with a resistively heated wire. The reaction can be self-propagating and can reach completion in less than about 1 second. A $MgCl_2$ byproduct can be washed away with a suitable solvent, and a resulting product can include rhenium diboride, along with $Re_7B_3$ and $Re_3B$. The use of excess boron can result in a substantially pure rhenium diboride. In particular, heating the product in a sealed container with about 3 molar excess of boron to a temperature in the range of about 900° C. to about 1100° C. for about 2 to 4 days can yield rhenium diboride, with the substantial absence of the other $Re_yB_x$ phases.

As another example, rhenium powder and boron powder can be used as elemental precursors for arc-melting, which can be carried out in an inert gas atmosphere. The use of excess boron can result in a substantially pure rhenium diboride, and can compensate for loss of boron upon arc-melting. In particular, arc-melting can be carried out using a 1:2.5 molar mixture of Re:B. By applying a current in the range of about 70 amps to about 120 amps, elevated temperatures can be achieved to yield rhenium diboride, with the substantial absence of the other $Re_yB_x$ phases. Multiple arc-melting cycles can be carried out, such as about 3 to 5 cycles, to ensure homogeneous mixing of the elements.

As another example, rhenium powder and boron powder can be used as precursors for an elemental reaction. The reaction can be carried out using a 1:2 molar mixture of Re:B in a sealed container. Heating the mixture to a temperature in the range of about 900° C. to about 1100° C. for about 4 to 6 days (or heating the mixture to a temperature in the range of about 750° C. to about 1100° C. for about 1 to 6 days) can yield rhenium diboride. In some instances, the use of excess boron can yield rhenium diboride, with the substantial absence of the other $Re_yB_x$ phases.

As another example, rhenium powder and boron powder can be used as elemental precursors for an aluminum flux reaction, which can be carried out in an inert gas atmosphere. An excess of aluminum can be used as a growth medium. In particular, the reaction can be carried out using a 1:2:50 molar mixture of Re:B:Al, and the mixture can be heated to a temperature in the range of about 1300° C. to about 1500° C. for about 1 to 6 days and cooled to about 700° C. for about 1 to 7 days. The aluminum flux can be dissolved in a suitable solvent, such as NaOH, and a resulting product can include rhenium diboride. In some instances, the use of excess boron can yield rhenium diboride, with the substantial absence of the other $Re_yB_x$ phases.

Figure 2:
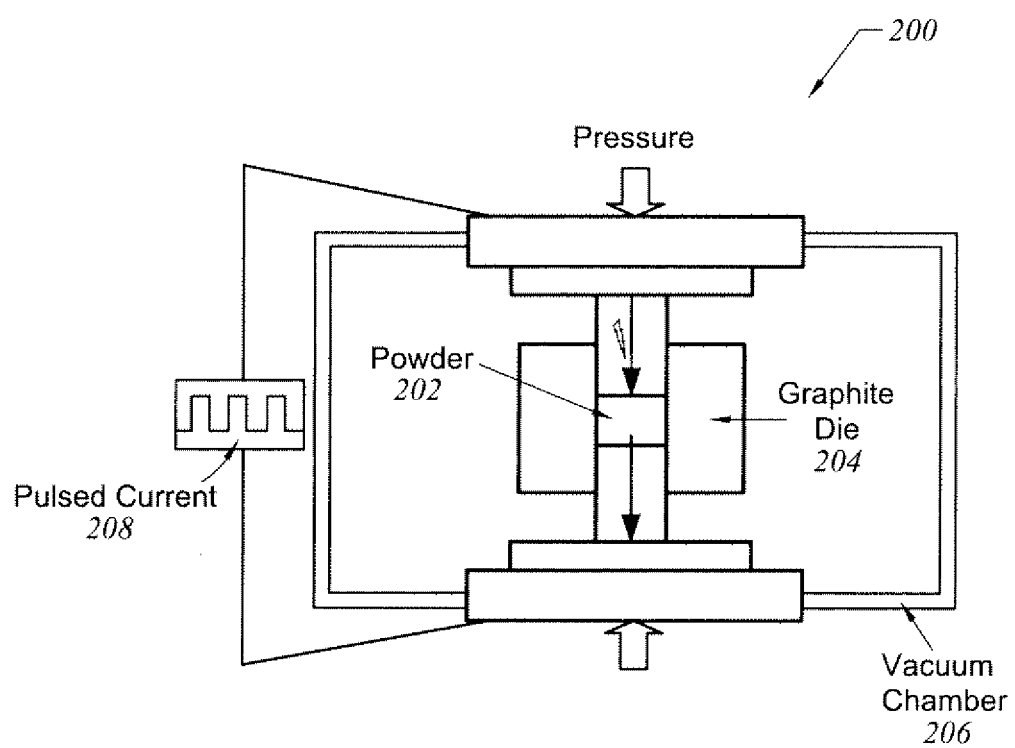
FIG. 2 illustrates a Spark Plasma Sintering furnace that can be used to achieve densification, according to an embodiment of the invention.

As a further example, rhenium powder and boron powder can be used as precursors for an elemental reaction. The reaction can be carried out using a 1:2 molar mixture of Re:B in a sealed container, and heating the mixture to a temperature in the range of about 600° C. to about 1000° C. for about 2 to 6 days can yield a product including rhenium diboride in a powder form. Next, the resulting product can be subjected to densification using SPS. Advantageously, SPS can achieve densification with fast ramp rates and short heating times, thereby avoiding or reducing grain coarsening or grain growth that can detrimentally impact resulting mechanical characteristics. FIG. 2 illustrates a SPS furnace 200 that can be used to achieve densification, according to an embodiment of the invention. Referring to FIG. 2, rhenium diboride powder 202 is disposed in a graphite die 204 within a vacuum chamber 206. A pressure in the range of about 40 MPa to about 60 MPa is then applied, while the powder 202 is rapidly heated to a temperature in the range of about 1300° C. to about 1900° C. via a pulsed direct electric current from a current source 208. Substantially complete densification can be achieved within a few minutes due to the fast ramp rates attainable with the SPS furnace 200. In some instances, incorporation of excess boron in the powder 202 can result in a substantially pure rhenium diboride, and can compensate for loss of boron during sintering. Excess boron can sometimes lead to increased oxygen concentration in the form of surface oxides that can impede full densification. To reduce oxygen concentration, a sintering aid, such as carbon or molybdenum disilicide, can be used for oxygen removal. It is contemplated that rhenium powder and boron powder can be directly reacted in the SPS furnace 200 to form densified rhenium diboride, rather than undergoing an initial elemental reaction and then undergoing subsequent densification in the SPS furnace 200.

Uses of Rhenium Boride Compounds

The rhenium boride compounds described herein can be used for a variety of applications, ranging from abrasives and cutting tools to protective coatings. For example, the rhenium boride compounds can be substituted in place of, or used in conjunction with, diamond or another hard or superhard material for those applications involving abrasion, cutting, polishing, and protection. Once synthesized, the rhenium boride compounds can be dispersed within suitable binders or otherwise disposed adjacent to a surface according to a variety of techniques for applying hard and superhard materials to surfaces.

Figure 3:
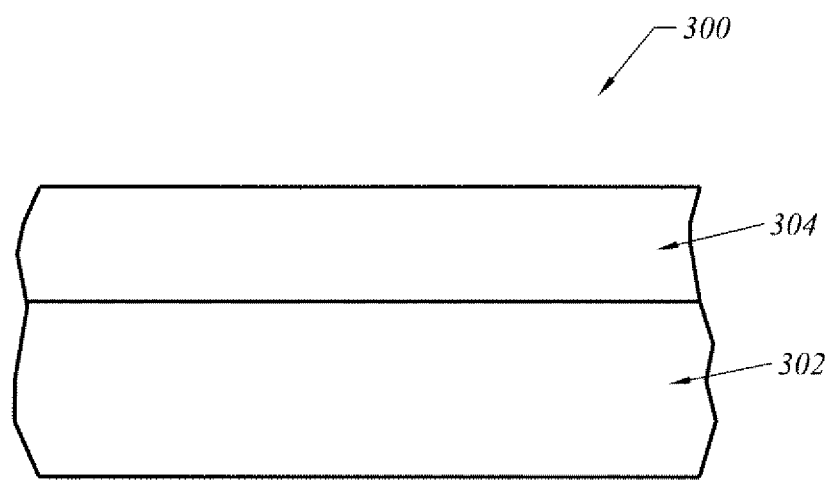
FIG. 3 illustrates a cross-sectional view of a portion of an article implemented in accordance with an embodiment of the invention.

FIG. 3 illustrates a cross-sectional view of a portion of an article 300, according to an embodiment of the invention. For example, the article 300 can be an abrading, cutting, or polishing tool. As another example, the article 300 can be any article for which protection from abrasion or cutting is desired. As illustrated in FIG. 3, the article 300 is implemented in accordance with a multi-layered design and includes a first layer 302 and a second layer 304 that is adjacent to the first layer 302. The first layer 302 is implemented as a substrate and is formed from any suitable material, such as a fibrous material, a ceramic, a metal, a metal alloy, a polymer, or a composite. While not illustrated in FIG. 3, it is contemplated that the first layer 302 can be formed so as to include two or more sub-layers, which can be formed from the same material or different materials.

As illustrated in FIG. 3, the second layer 304 is implemented as a coating and is formed from a rhenium boride compound. In particular, the second layer 304 can be formed from a rhenium diboride according to formula (I) alone or in combination with another material, such as a binder. During use, the second layer 304 can be disposed so that it is exposed to an outside environment, thus serving as an outer coating. For example, if the article 300 is an abrading, cutting, or polishing tool, an exposed surface of the second layer 304 can be disposed so as to contact another article to be abraded, cut, or polished. As another example, the second layer 304 can serve as a scratch-resistant coating to render protection from abrasion or cutting.

While two layers are illustrated in FIG. 3, it is contemplated that the article 300 can include more or less layers for other implementations. In particular, it is contemplated that the article 300 can include a third layer (not illustrated in FIG. 3) that is formed from the same or a different rhenium boride compound. It is also contemplated that the first layer 302 can serve as a temporary substrate during formation of the second layer 304. Subsequent to the formation of the second layer 304, the first layer 302 can be separated or removed using any suitable technique.

EXAMPLES

The following examples describe specific aspects of some embodiments of the invention to illustrate and provide a description for those of ordinary skill in the art. The examples should not be construed as limiting the invention, as the examples merely provide specific methodology useful in understanding and practicing some embodiments of the invention.

Example 1

Synthesis and Characterization of Rhenium Diboride

Figure 4:
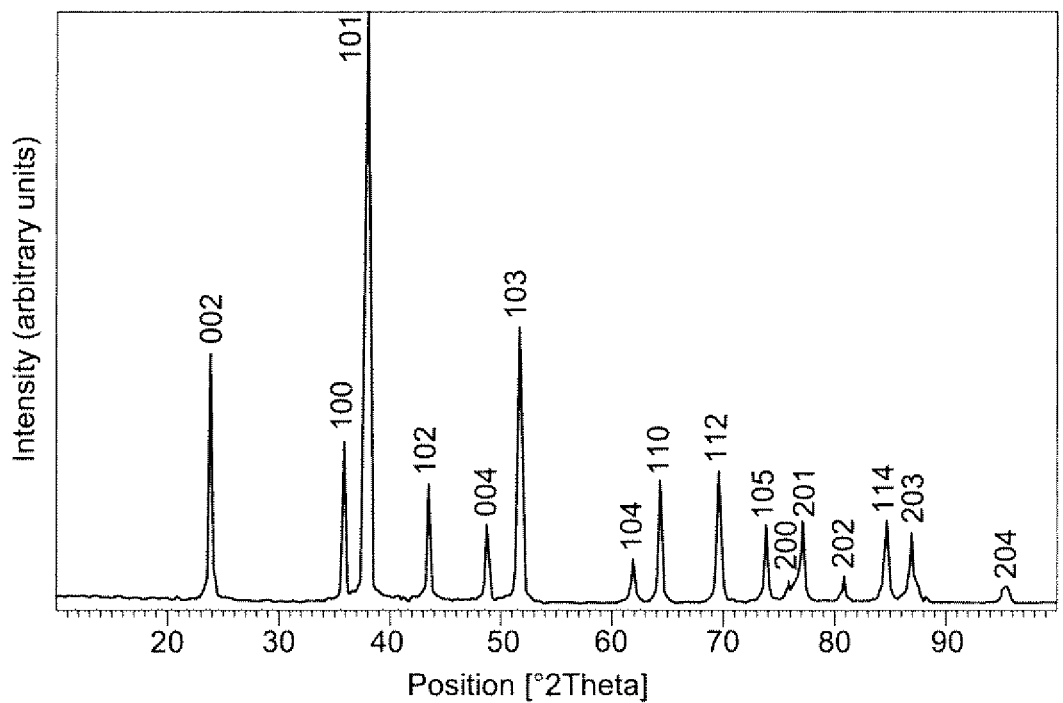
FIG. 4 illustrates a powder X-ray diffraction pattern of rhenium diboride synthesized from the elements, according to an embodiment of the invention.

Polycrystalline rhenium diboride was synthesized under ambient pressures via three techniques, each of which can be potentially scaled up. First, a solid-state metathesis reaction was carried out between the metal trichloride and $MgB_2$. Without excess boron, however, the metathesis reaction can form multiple boride phases. Second, an arc-melting reaction was carried out by mixing rhenium and boron powders together, pressing the powders into a pellet, and then liquefying the pellet with about 80 amps of current in an argon atmosphere. The result was a solid metallic ingot of rhenium diboride that can be used for hardness testing. In a third technique involving elemental reactions, stoichiometric quantities of rhenium and boron powders were sealed in a quartz tube under vacuum and heated for about 5 days at about 1000° C. Powder X-ray diffraction, performed on a crushed portion of both the arc-melted ingot and a powder produced from elemental reactions, confirmed the synthesis of phase-pure rhenium diboride. FIG. 4 illustrates a powder X-ray diffraction pattern of rhenium diboride synthesized from the elements. These materials were then examined by micro-indentation and in situ high-pressure X-ray diffraction techniques.

To determine the Vickers hardness $H_V$ of rhenium diboride, micro-indentation measurements were performed using a square pyramidal-shaped diamond indenter tip lowered onto a polished ingot with a known amount of force. When the indenter was removed, an area of the indent, indicating an extent of plastic deformation of the sample, was measured. From this area and the applied load P, $H_V$ was determined using equation (1):

$$H_V = 1854.4 P/d^2 \qquad (1)$$

where d is an arithmetic mean of two diagonals of the indent.

Figure 5:
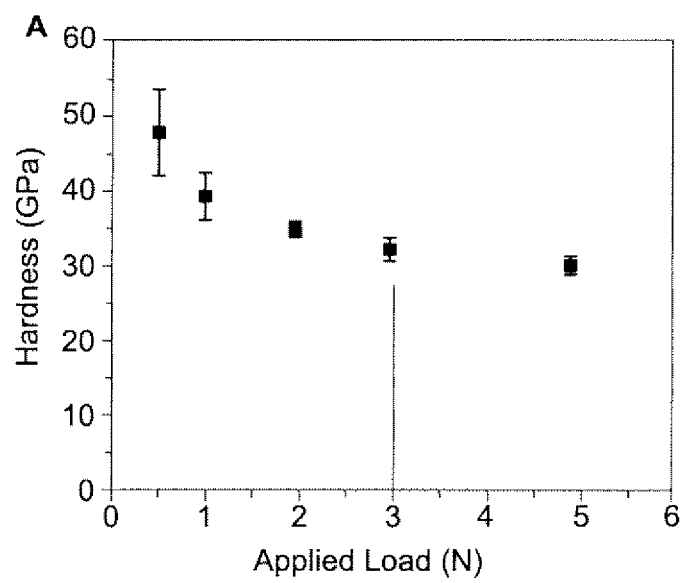
FIG. 5 illustrates Vickers hardness $H_V$ of rhenium diboride plotted as a function of applied load, according to an embodiment of the invention.

Five indentations were carried out at varying loads on each of 10 grains of rhenium diboride. FIG. 5 illustrates $H_V$ plotted as a function of applied load and measured at room temperature. As the load was decreased from 4.9 N to 0.49 N, the average hardness increased from about 30.1±1.3 GPa to about 48.0±5.6 GPa, with a maximum measured hardness of about 55.5 GPa under 0.49 N of load, which is comparable to the hardness of cubic BN under a similar load. The observed inverse relationship of applied load to hardness is expected to result from an indentation size effect. Although many factors may contribute to this effect, it is likely attributed to strain gradient plasticity in micro-indentation measurements. Referring to FIG. 5, the asymptotic hardness of rhenium diboride at high loads is about 30.1 GPa. The high hardness of rhenium diboride was corroborated by a scratch test in which a piece of rhenium diboride ingot was used to scratch a polished face of natural diamond parallel to the (100) plane. In particular, the ingot of rhenium diboride (about 4 mm in diameter) was attached to a stylus with mounting wax, and was moved across the polished diamond surface using merely the weight of the stylus to supply the force. Based on an Atomic Force Microscopy image of the resulting scratch, the depth profile indicated that the scratch was about 2 mm wide, with a depth of about 230 nm.

The covalent bonding that results in high hardness values can also contribute to elastic incompressibility of a material. To further explore the contribution of covalent bonding as well as the possible correlation between valence-electron density and bulk elastic characteristics, data on the elastic volume compressibility of rhenium diboride were collected via in situ high pressure X-ray diffraction measurements. Samples were compressed quasi-hydrostatically up to about 30 GPa in a diamond anvil cell, and in situ diffraction data were collected under pressure. From the diffraction data, the fractional volume at increasing pressures was calculated. Fitting the pressure/volume (P versus $V/V_0$) data with a third-order Birch-Murnaghan equation of state, the bulk modulus of rhenium diboride was determined to be about 360 GPa when $B_o'$ (derivative of the zero-pressure bulk modulus with respect to pressure) was fixed at a canonical value of 4. This high bulk modulus is consistent with the expected correlation between valence-electron density and incompressibility.

Figure 6:
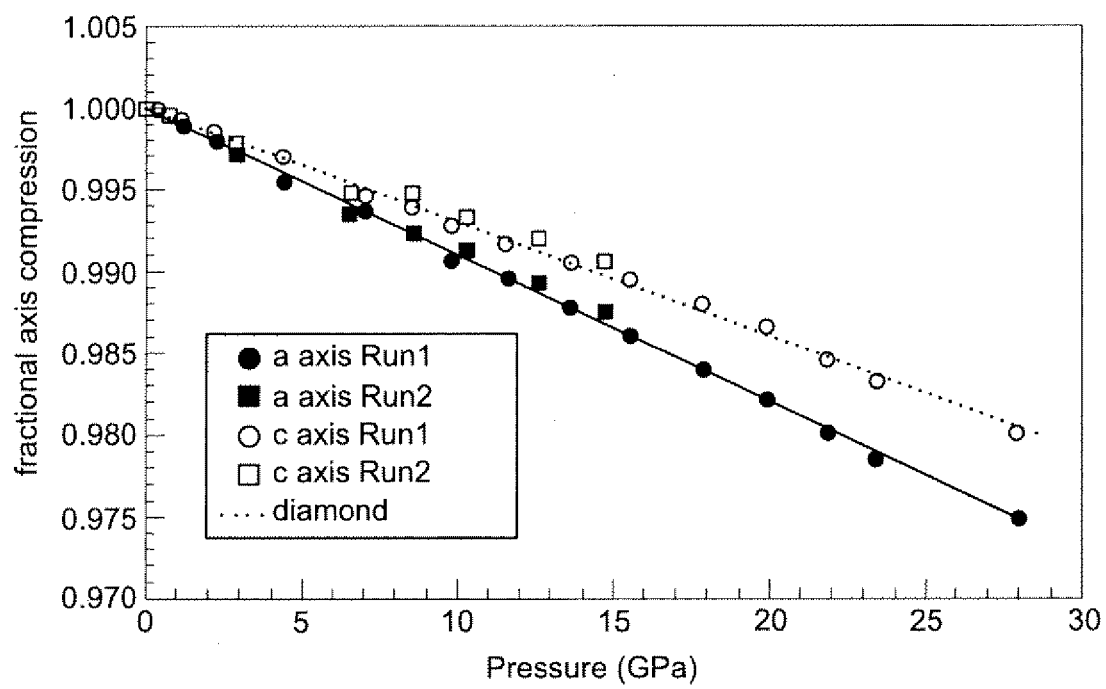
FIG. 6 illustrates compressibility of the a axis and the c axis of rhenium diboride, according to an embodiment of the invention.

In addition to bulk volume compressibility, the high-pressure diffraction data also revealed an anisotropy in the compressibility of two different lattice directions of hexagonal rhenium diboride. As illustrated in FIG. 6, the c axis is substantially less compressible than the a axis, and the c axis linear compressibility value is similar to a corresponding linear compressibility value of diamond. This anisotropy is expected to result from greater electron density along the c axis and, therefore, greater electronic repulsions along that axis.

Mechanical anisotropy among the crystallographic planes in rhenium diboride was further investigated through high-pressure radial diffraction measurements, which differed from the isotropic diamond anvil cell measurements described above. Here, a sample, which was held in place by a beryllium gasket, was subjected to non-hydrostatic pressures in a diamond anvil cell. The sample stress state can be divided into hydrostatic and deviatoric components. Hydrostatic compression of the sample can result in elastic volume compression following the sample's P(V) equation of state. The deviatoric component can be more complex, resulting from a combination of the applied-stress state and the sample's mechanical response. To understand these plastic deformations, the stress state inside the pressure cell was considered. The direction of maximum stress was deemed to be along the loading axis of the diamond anvil cell ($\sigma_1$), and the minimum stress direction was deemed to be cylindrically symmetric in the plane of the gasket ($\sigma_3$). The difference between these two stresses is the differential stress t, which, if high enough, can produce plastic deformation. Such high t values can be represented by the von Mises yield criterion of equation (2):

$$t = \sigma_1 - \sigma_3 \leq 2\tau = \sigma_y \quad (2)$$

where $\tau$ is the shear strength, and $\sigma_y$ is the yield strength. Therefore, an estimate of t provides a lower-bound estimate of the sample's $\sigma_y$.

The differential stress can be calculated from measurements of lattice strain in the maximum and minimum stress directions and from single-crystal elastic characteristics via linear elasticity. Instead of using single-crystal elastic moduli data, isotropic lattice strain theory was applied for the analysis of strength in rhenium diboride. In this approach, the isotropic theory was applied to each lattice plane individually. Although differences in strength behavior among different lattice planes can be an indication of elastic anisotropy, a full anisotropic analysis is not expected to substantially change the conclusions that can be drawn from the data.

For isotropic materials, the differential stress can be calculated from the lattice strain data using equations (3) and (4):

$$t = 6G<(\epsilon_{hydro} - \epsilon_{90})> \quad (3)$$

$$\epsilon_{hydro} = (2\epsilon_{90} + \epsilon_0)/3 \quad (4)$$

where G is the aggregate shear modulus of the sample, $\epsilon_{hydro}$ is the hydrostatic strain, and $\epsilon_{90}$ and $\epsilon_0$ are the strains at the minimum and maximum stress directions, respectively. These strains, specific for each lattice plane, were determined directly from positions of peaks in the X-ray diffraction patterns.

Figure 7:
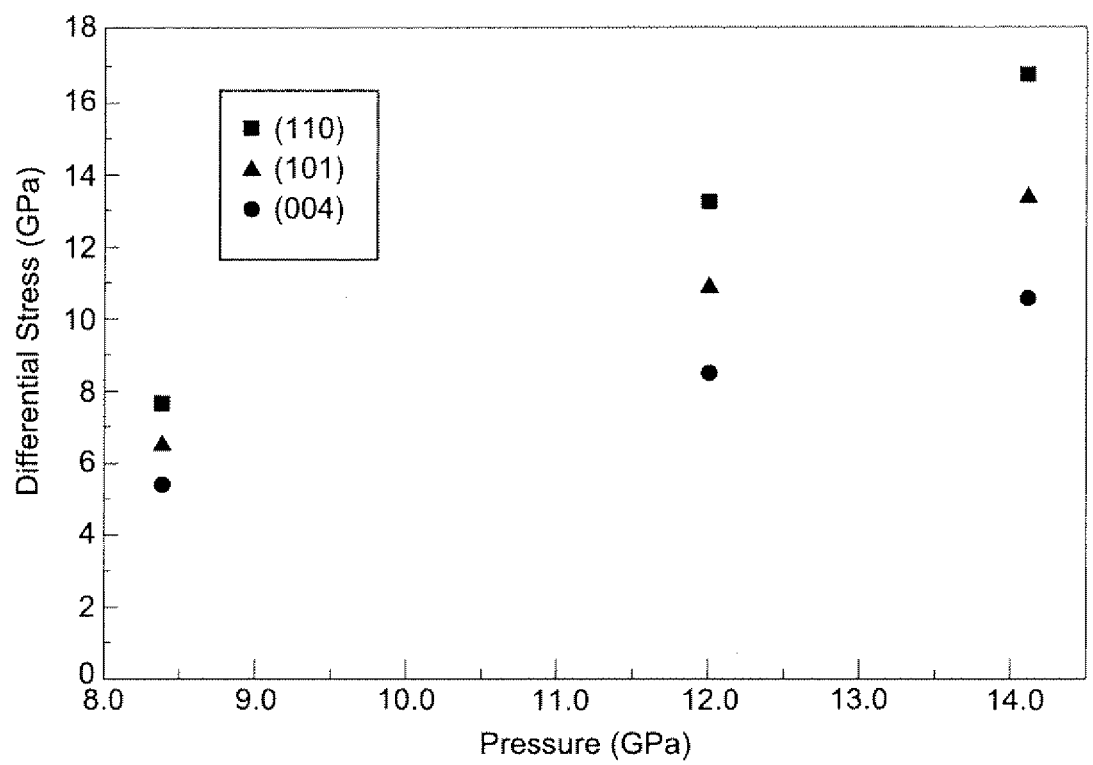
FIG. 7 illustrates differential stress supported by different planes in rhenium diboride, according to an embodiment of the invention.

A greater difference in the strain between the minimum and maximum stress directions typically translates into a greater ability by a material to support the differential stress in that plane without plastic deformation. FIG. 7 illustrates differential stress supported by different planes in rhenium diboride. In the measurements, data were collected from 0 to 14 GPa, where rhenium diboride supports a lattice averaged differential stress of about 6.4 GPa to about 12.9 GPa. Other superhard materials, such as cubic $Si_3N_4$, $B_6O$, and $TiB_2$, are typically able to support between about 5 GPa and about 10 GPa of differential stress at these pressures. The lattice plane anisotropy can be affected by the elastic anisotropy and potentially also plastic anisotropy. As can be appreciated with reference to FIG. 7, the (110) plane of rhenium diboride is the stiffest plane and is able to support a differential stress of about 17 GPa at about 14 GPa of pressure. In contrast, the (004) plane supports a substantially lower differential stress. The difference in each lattice plane's ability to support differential stress can be attributed to the layered crystal structure of rhenium diboride. The (004) plane, which is orthogonal to the c axis and, therefore, lies parallel to the layers of rhenium and boron, is expected to be a slip plane and a location of stress release at high pressures. Consequently, the (004) is able to support less differential stress than the other planes investigated. In contrast, the (110) plane, which is perpendicular to the slip plane, is able to support the largest differential stress. Also, as expected, the (101) plane, which has a component both parallel and perpendicular to the c axis, has an intermediate value between that of the (110) and (004) planes.

Given the observation that different planes of rhenium diboride support varying amounts of stress in the high-pressure measurements, this effect is also expected in the hardness measurements. In particular, FIG. 5 indicates that there is a spread between the highest and lowest measured hardness across grains of rhenium diboride under the same load. For example, under a load of 4.9 N, the highest measured hardness is about 32.5 GPa, and the lowest measured hardness is about 26.0 GPa. This observed spread in hardness values at constant load can be attributed to the anisotropic structure of rhenium diboride, combined with the lack of control of crystallographic orientation of the tested grains.

This variation in hardness was further investigated using electron backscattering diffraction to measure the orientations of the tested grains. The results indicate that indentations parallel to the (001) planes yielded the lowest average hardness, namely a value of about 27 GPa. In contrast, indentations along directions that contained a larger component parallel to the c axis (that is, perpendicular to the (001) planes) resulted in measurements with an average hardness of about 31 GPa, which is an increase of about 15 percent. In the micro-indentation measurements, none of the tested grains had a pure (001) orientation. As a result, the data can indicate a minimum average hardness, and it is expected that measurements parallel to the c axis can yield an even higher hardness. The dependence of hardness data on crystallographic orientation can be explained by the presence of slip planes as described above. Furthermore, because similar anisotropic behavior was observed in the high-pressure data, the radial diffraction data are expected to elucidate the plastic behavior of rhenium diboride, giving an indication of the yield strength rather than merely measuring elastic behavior.

The following sets forth methodology used to carry out the measurements described in Example 1.

The synthesis of rhenium diboride was carried out using solid-state metathesis, arc-melting, and direct heating of the elements. For metathesis, a 2:3 molar mixture of $ReCl_3$:$MgB_2$ was pressed into a pellet in a helium-filled glovebox, and was initiated in a steel reactor with a resistively heated Nichrome wire. The reaction was self-propagating and went to completion in less than about 1 second. A $MgCl_2$ byproduct salt was washed away with methanol, after which the sample was air dried. X-ray diffraction indicated the formation of rhenium diboride, along with $Re_7B_3$ and $Re_3B$. The use of excess boron yielded substantially pure rhenium diboride.

For arc-melting, rhenium powder (−325 Mesh, 99.99 percent, Rhenium Alloys, Inc.) and boron powder (≦1 µm, 99.9 percent, Cerac) were mixed together and pressed into a pellet with a Re:B molar ratio of 1:2.5. The elements were arc-melted on a water-cooled copper hearth in an argon atmosphere. The sample was melted 3-5 times to ensure homogeneous mixing of the elements. An excess of 0.5 moles of boron was used to compensate for the loss of boron upon arc-melting and to ensure an X-ray phase-pure product. The resulting ingot exhibited a shiny, metallic luster.

For elemental reactions, rhenium powder (−325 Mesh, 99.99 percent, Rhenium Alloys, Inc.) and boron powder (≦1 µm, 99.9 percent, Cerac) were mixed together and sealed under vacuum in a quartz tube. The reaction temperature was raised to about 1000° C. and maintained for about 5 days. The sample was then allowed to cool to room temperature at a rate of about 100° C./hr. Using thermogravimetric analysis, the resulting rhenium diboride powder was determined to be stable in dry air up to about 500° C.

X-ray diffraction patterns were collected on a PANalytical XPert Pro powder diffractometer with Cu $K_\alpha$ radiation ($\lambda=1.5418$ Å). A portion of the rhenium diboride ingot was crushed for powder diffraction measurements, and the synthesized polycrystalline powders were used as is. Powder patterns were indexed and matched to JCPDS file 00-011-0581 to confirm that single phase rhenium diboride was synthesized with lattice parameters $\alpha=2.9$ Å and $c=7.478$ Å.

Micro-indentation measurements were carried out on a Vickers diamond microindenter (Buehler Company). Indentations were measured using an Axiotech 100 reflected light microscope (Zeiss) with a 500× magnification objective lens. Digital images were taken using an attached AxioCam MRc color CCD camera.

Conventional high pressure diamond anvil cell measurements were carried out on beamline 11.3.1 with a wavelength of about 0.733 Å. Samples were compressed with ethylcyclohexane as the pressure medium in a gas membrane pressurized diamond anvil cell (Diacell). Sodium chloride was used as an internal pressure calibrant.

Energy dispersive radial diffraction data were collected on beamline X17C. Rhenium diboride powder was loaded into a pre-indented beryllium gasket hole (about 100 µm in diameter and about 30 µm thick). The sample was compressed in a diamond anvil cell equipped with 300 µm diamond culets and without inclusion of a pressure medium to create non-hydrostatic pressure conditions. The X-ray beam was focused by a pair of Kirkpatrick-Baez mirrors to a spot size of about 10 µm×10 µm. Data were collected at room temperature and pressure and at three elevated pressures. At each pressure, eight diffraction patterns were collected as the diamond anvil cell was rotated through angle ψ about the X-ray beam. The angle between the X-ray beam and the detector, namely 2θ, remained substantially fixed at about 9.994±0.002°, as calibrated by gold foil. Diffracted intensity as a function of energy was collected with a solid state germanium detector calibrated by a series of fluorescence standards at the beginning of the measurements. Each pattern was collected over periods varying from about 5 minutes to about 60 minutes.

Example 2

Synthesis and Characterization of Rhenium Diboride and Other Transition Metal Diborides To elucidate a potential correlation between hardness and elastic moduli, hardness values and Young's moduli of rhenium diboride and two other transition metal diborides, namely $RuB_2$ and $OsB_2$, were measured using nano-indentation techniques. The bulk and shear moduli of these materials were then calculated using an isotropic model, and the correlation between hardness and stiffness was examined.

Polycrystalline rhenium diboride was synthesized by arc-melting elemental boron with rhenium metal with an applied current of about 80 amps under an argon atmosphere at room temperature. The arc-melted crystals were crushed into powder and then characterized using a PANalytical XPert Pro X-ray powder diffractometer with Cu $K_\alpha$ radiation. The nano-indentation testing was carried out using a MTS Nano Indenter XP instrument with a diamond Berkovich indenter. The hardness H and Young's modulus E were calculated using a methodology similar to that described in W. C. Oliver and G. M. Pharr, J. Mater. Res. 7, 1564 (1992), the disclosure of which is incorporated herein by reference in its entirety.

Figure 8:
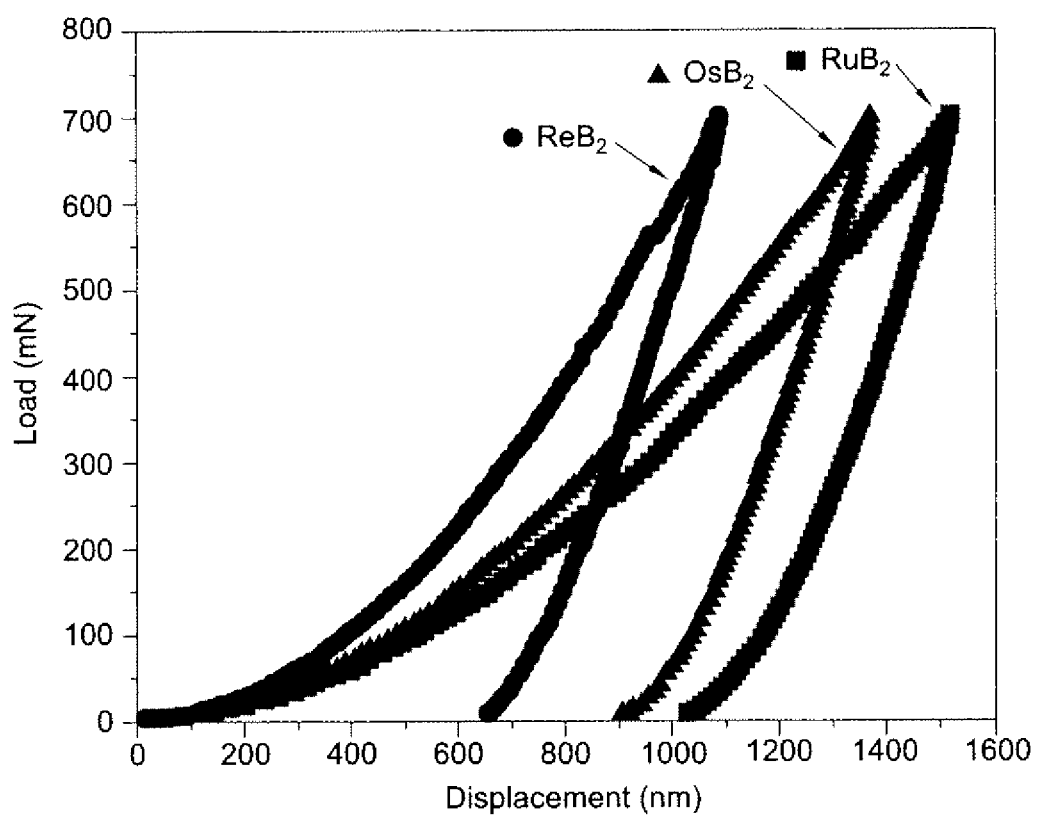
FIG. 8 illustrates load-displacement curves for rhenium diboride and two other transition metal diborides, according to an embodiment of the invention.

As illustrated in FIG. 8, load-displacement curves with a 0.05 $sec^{-1}$ strain rate and 720 mN maximum load were obtained on single grains for each of the three transition metal diborides. Under the same load, the diamond indenter penetrated deeper into $OsB_2$ and $RuB_2$ than into rhenium diboride, indicating that rhenium diboride is the hardest among these three transition metal diborides. The average measured hardness values are about 19.2±2.1 GPa, about 21.6±3.0 GPa, and about 37.0±1.2 GPa for $RuB_2$, $OsB_2$, and rhenium diboride, respectively.

Theoretical Poisson's ratio values ν of these three transition metal diborides, namely 0.27 for $RuB_2$ and $OsB_2$ and 0.18 for rhenium diboride, were used to calculate the Young's moduli. The value of the Poisson's ratio is typically indicative of the degree of directionality of covalent bonds. The smaller Poisson's ratio for rhenium diboride, compared to $RuB_2$ and $OsB_2$, indicates a stronger degree of covalent bonding that results in the higher hardness. The calculated Young's moduli are compared with those expected from first-principles calculations, as set forth in Table 1 below. Both of the calculated Young's moduli for $OsB_2$ and rhenium diboride are in substantial agreement with the theoretical values. In addition, rhenium diboride has the highest Young's modulus of about 712±43 GPa.

TABLE 1

| Material | H (GPa) | E (GPa) | $E_{first-principles\ calculation}$ (GPa) | ν |
|---|---|---|---|---|
| $RuB_2$ | 19.2 ± 2.1 | 366 ± 45 | ... | $0.27^a$ |
| $OsB_2$ | 21.6 ± 3.0 | 410 ± 35 | $426-444^a$ | $0.27^a$ |
| $ReB_2$ | 37.0 ± 1.2 | 712 ± 43 | $683-699^b$ | $0.18^b$ |

As illustrated in FIG. 8, the load-displacement curves for $RuB_2$, $OsB_2$, and rhenium diboride include multiple pop-in events. The pop-in events are expected to result from crack initiation and propagation around indentations. In rhenium diboride, a critical force for the first pop-in event is about 600 mN, and the deviation is not significant due to lesser asymmetry in hexagonal rhenium diboride when compared to orthorhombic $OsB_2$. Additionally, the length of a crack surrounding the indentation impression is significantly shorter for rhenium diboride than that observed for $OsB_2$. These results indicate that critical forces to cause pop-in events can depend on materials, crystallographic orientation, and quality of grains, such as the presence of impurities or defects.

An isotropic model was used to calculate the bulk modulus B and shear modulus G based on the Young's modulus E derived from the nano-indentation measurements. The calculated bulk and shear moduli are compared with those expected from first-principles calculations and X-ray experimental data, as set forth in Table 2 below. Both the bulk modulus and shear modulus of rhenium diboride calculated from the isotropic model are in substantial agreement with those based on X-ray measurements and first-principles calculations.

TABLE 2

| | B (GPa) | $B_{x-ray}$ measurement (GPa) | $B_{first-principles}$ calculation (GPa) | G (GPa) | $G_{first-principles}$ calculation (GPa) |
|---|---|---|---|---|---|
| $RuB_2$ | 265 ± 33 | 281 | $335^c$ | 144 ± 18 | ... |
| $OsB_2$ | 297 ± 25 | $365-395^d$ | $307-365^{a,c,e,f}$ | 161 ± 14 | $168-254^{a,c}$ |
| $ReB_2$ | 371 ± 22 | $360^g$ | $347-377^b$ | 302 ± 18 | $285-299^b$ |

Figure 9:
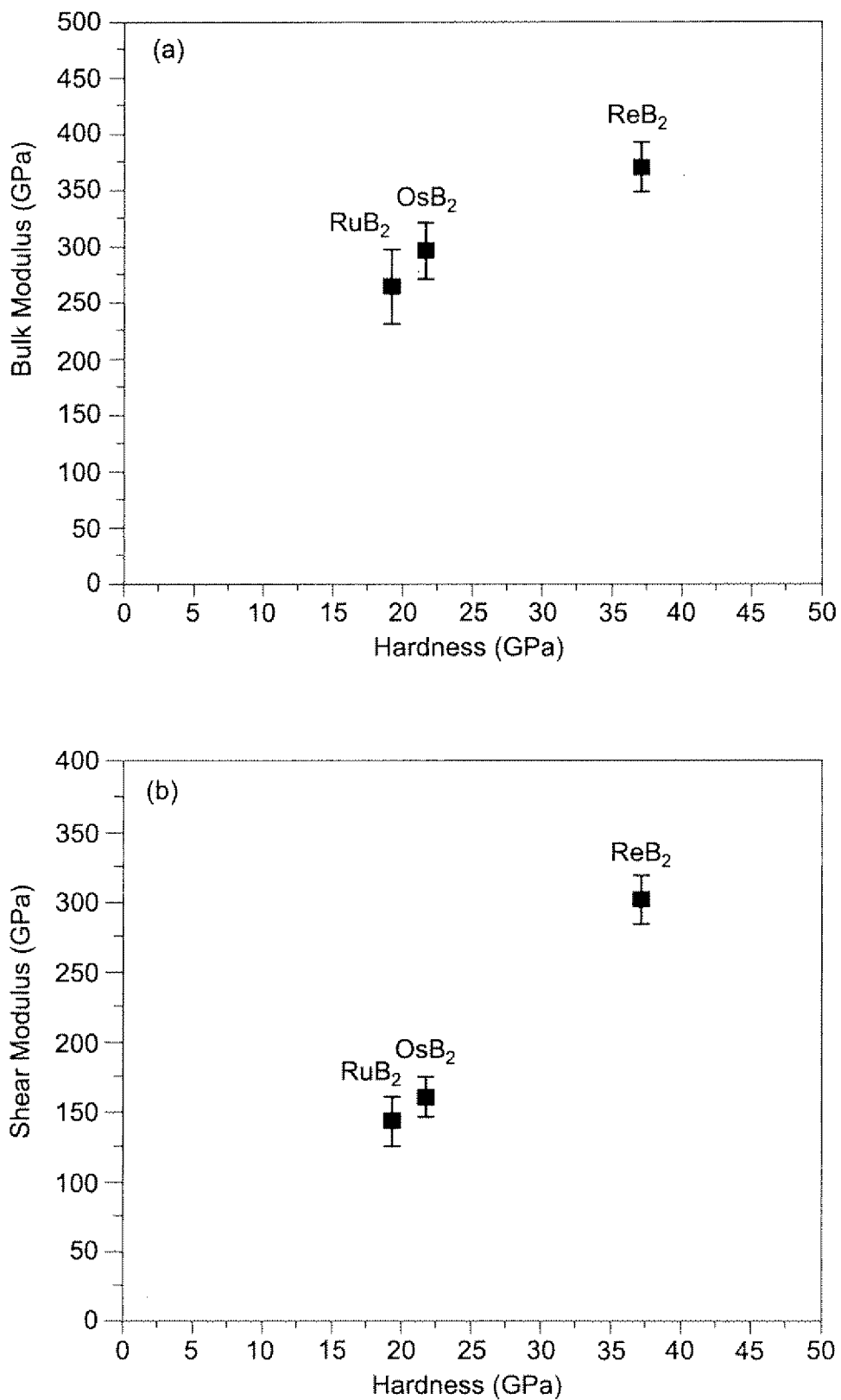
FIG. 9(a) and FIG. 9(b) illustrate plots of hardness as a function of bulk modulus and shear modulus for rhenium diboride and two other transition metal diborides, according to an embodiment of the invention.

FIG. 9(a) and FIG. 9(b) illustrate plots of hardness as a function of bulk modulus and shear modulus for $RuB_2$, $OsB_2$, and rhenium diboride, respectively. The data of hardness versus shear modulus substantially lie along the same straight line, while the data of hardness versus bulk modulus scatter away from a linear relationship. The latter is expected to result from the bulk modulus' dependency on the spatially averaged electron density within three-dimensional, densely packed networks, with reduced dependency on the type of bonds formed, namely metallic, ionic or covalent. On the other hand, the shear modulus has greater sensitivity to the non-uniform distribution of valence-electron density corresponding to directional bonds, which can act as barriers for dislocation movement. Therefore, the shear modulus is a better predictor of hardness than the bulk modulus.

Example 3

Synthesis and Characterization of Rhenium Diboride

The following describes the synthesis and characterization of rhenium diboride single crystals grown by an aluminum flux technique.

Powders of rhenium metal (Rhenium Alloys, Inc., 99.99 percent) and amorphous boron (Cerac, Inc., 99.9 percent) were added to an alumina crucible including an excess of aluminum (Cerac, 99.999 percent) as a growth medium. Using about 2 g of rhenium, the molar ratio of Re/B/Al was specified at 1:2:50. The crucible was covered and placed in an alumina tube in a resistively heated furnace with flowing argon gas. The furnace was heated to about 1400° C. at a rate of about 100° C./h, held for about 5 hours, slowly cooled to about 700° C. at a rate of about 10° C./h, and then quickly cooled to room temperature. The aluminum flux was then dissolved in 6 M NaOH, and the resulting products were filtered with deionized water and dried in air.

Powder X-ray diffraction patterns were collected on a XPert Pro powder diffractometer with Cu $K_α$ radiation (λ=1.5418 Å; PANalytical). The crystal faces were indexed on a SMART 1000/APEX II single crystal diffractometer (Bruker Corp.). Electron micrograph images were collected using a JSM-6700F field emission scanning electron microscope (JEOL Ltd.). Thermal stability measurements were collected on a Pyris Diamond TG/DTA (Perkin-Elmer Instruments) between about 23° C. and about 1000° C. with a heating rate of about 10° C./min. For indentation measurements, samples were encased in a slow-curing epoxy resin, and preliminary polishing was carried out using silicon carbide abrasive paper. Diamond films (30, 15, 6, 3, and 1 μm particle sizes) were used for fine polishing in order to obtain a mirror finish. Micro-indentation measurements were carried out on a Vickers diamond microindenter (Buehler Ltd.). Fifteen indents were made with a Vickers indenter at each load, beginning with about 4.9 N and ending at about 0.49 N, to ascertain the load-dependent hardness. The indentation diagonal lengths were measured using an Axiotech 100 reflected-light microscope (Carl Zeiss, Inc.) under 500× magnification. Digital images were taken using an attached AxioCam MRc color CCD camera (Carl Zeiss). Nano-indentation was carried out using a Nano Indenter XP with a Berkovich diamond indenter (MTS Systems Corp.). Hardness values were calculated in situ using a methodology similar to that described in W. C. Oliver and G. M. Pharr, J. Mater. Res. 7, 1564 (1992), which was previously noted in Example 2. Electrical resistivity measurements were carried out on a polished crystal 800 μm×1600 μm×700 μm using a conventional four-probe configuration. The probes were attached to the (002) face, and data were collected upon heating from about 12.5 K to about 300 K. Magnetic susceptibility measurements were carried out using a Magnetic Properties Measurement System (Quantum Design, Inc.) in a direct current field from about 2 K to about 300 K.

Crystals obtained from the aluminum flux were observed to have well-defined hexagonal symmetry, and the largest crystals grew to a size of about 3 mm in diameter and about 1 mm in thickness. The hexagonal faces indicate that the crystals grew primarily along the c axis. The crystal growth did not reach completion, as indicated by the presence of rhenium diboride powder along with the formed crystals.

Figure 10:
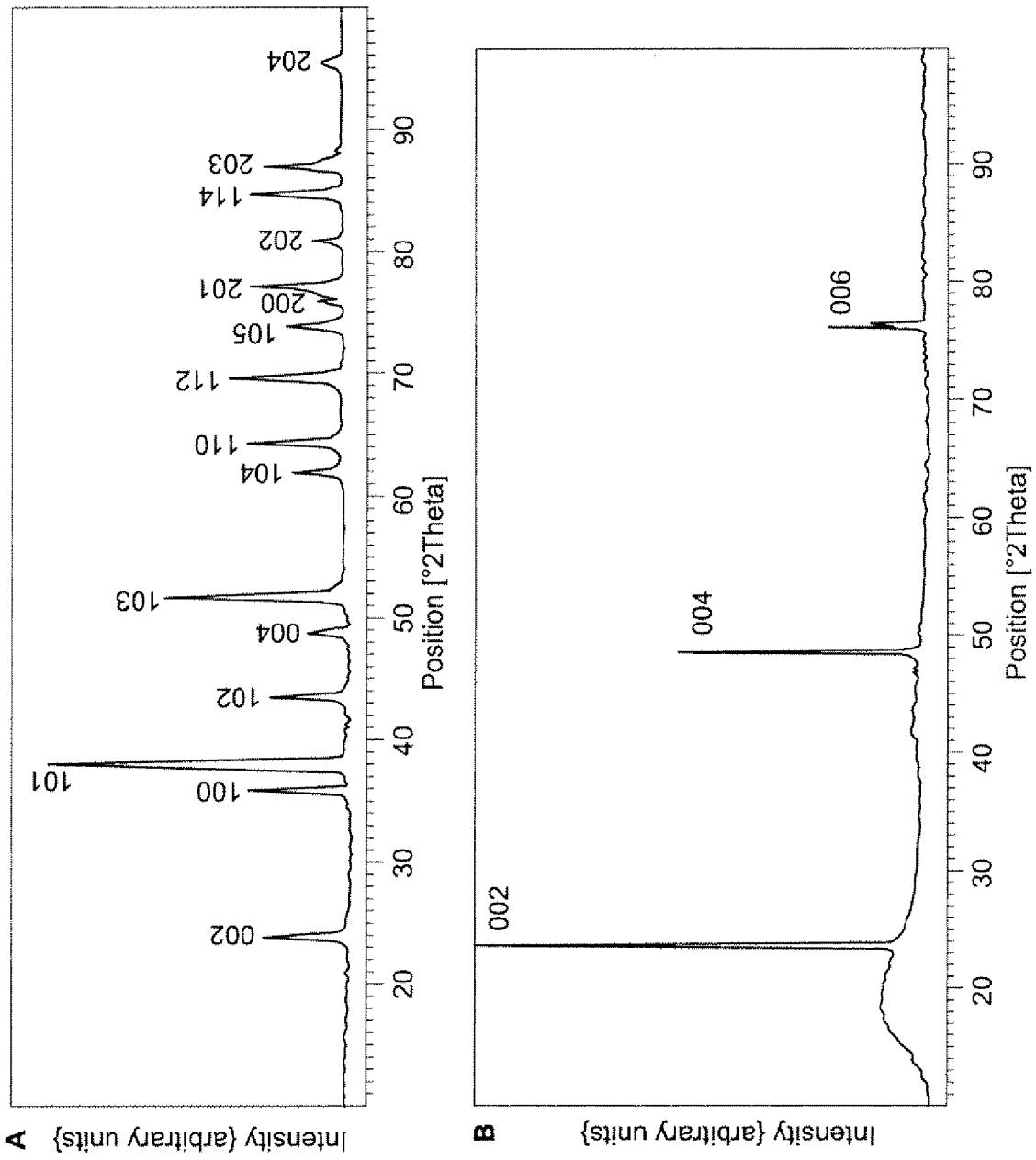
FIG. 10A and FIG. 10B illustrate X-ray diffraction patterns for pulverized rhenium diboride crystals and as-grown rhenium diboride crystals, respectively and according to an embodiment of the invention.

Powder X-ray diffraction measurements were collected on pulverized rhenium diboride crystals and indexed using silicon (Cerac, 99.999 percent) as an internal standard. The powder pattern, as illustrated in FIG. 10A, was matched to JCPDS file 00-011-0581, confirming the growth of rhenium diboride crystals. The lattice parameters were determined by Rietveld refinement with the JADE software package (version 6.0), and the values are in substantial agreement with $\alpha=2.897(2)$ Å and $c=7.472(4)$ Å, with a final $R_{wp}$ of about 12.75 percent. The somewhat high value for the R-factor can be attributed to preferred orientation effects of the pulverized crystals.

Powder X-ray diffraction measurements were also collected on the as-grown crystals oriented such that the hexagonal faces were parallel to the horizontal plane of the diffractometer. FIG. 10B illustrates the X-ray pattern for an as-grown crystal. Three peaks are present, corresponding to the (002), (004), and (006) planes and demonstrating that the (00l) plane grows outward. This growth pattern is expected to lead to the formation of hexagonal platelets oriented perpendicularly to the c axis. Terminating crystallographic planes present on the surface of the crystals provide further evidence that the crystals grow along the c axis.

Chemical analysis was carried out using Inductively Coupled Plasma Atomic Emission Spectroscopy ("ICPAES"). The composition of flux-grown rhenium diboride was determined to be $ReB_{1.85}$. The composition of arc-melted rhenium diboride was analyzed as a control and determined to form in a 1:2 molar ratio. The boron-deficient nature of the rhenium diboride crystals is expected to result from growing the crystals in a metal flux and may be responsible for the lower hardness values described below. Further elemental analysis indicated no detectable amount of oxygen in the crystals. However, aluminum inclusions formed about 1.1 atomic percent of the metal concentration, resulting in a composition of $ReAl_{0.011}B_{1.85}$. The inclusion of some amount of flux into the crystals is to be expected when synthesizing the crystals via the flux technique, particularly when using molten metals.

Figure 11:
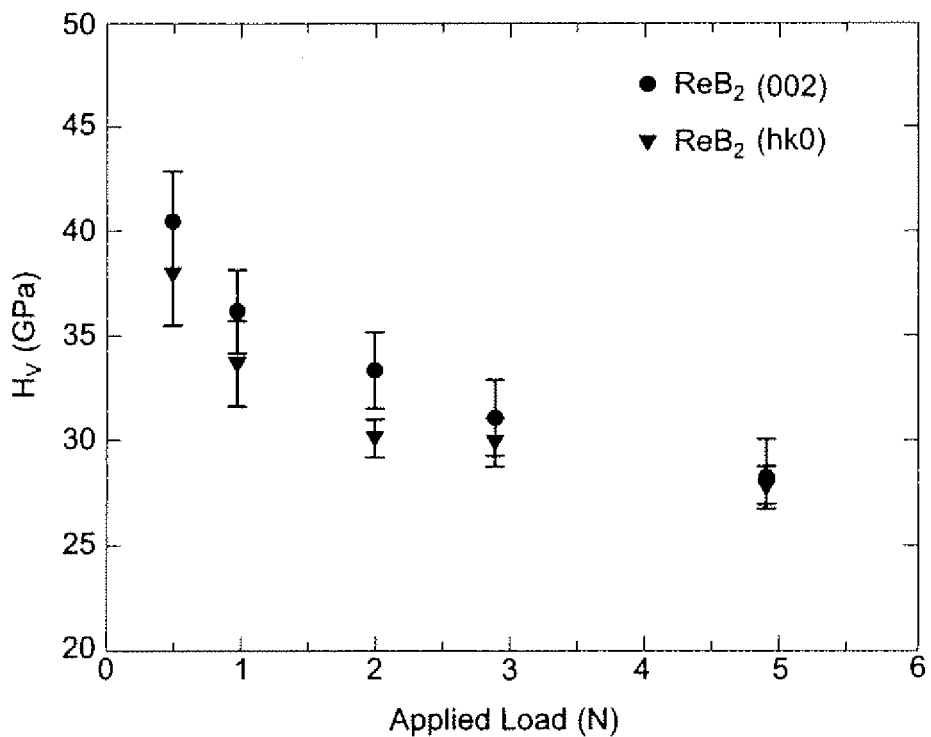
FIG. 11 illustrates Vickers hardness $H_V$ of rhenium diboride crystals plotted as a function of applied load, according to an embodiment of the invention.

Vickers hardness $H_V$ was determined by taking an average value for diagonals of a residual indentation and solving for hardness according to equation (1) previously noted in Example 1. Micro-indentation results for the rhenium diboride crystals are illustrated in FIG. 11. Indentations were made on the (002) plane and the (hk0) plane perpendicular to the c axis in order to determine the hardness anisotropy. Both lattice planes exhibit the phenomenon of load-dependent hardness, also referred as an indentation size effect. Under low load, the (002) plane exhibits a maximum hardness value of about 40.5±2.4 GPa, which is about 6 percent higher than the corresponding hardness value of the (hk0) plane. These values steadily decrease, reaching a minimum hardness under the maximum applied load of about 4.9 N, at which point the values for both lattice planes substantially converge to a hardness value of about 28 GPa. The reason the two different planes exhibit anisotropic behavior primarily under low load is expected to result from the masking of a primary slip system at high load.

Figure 12:
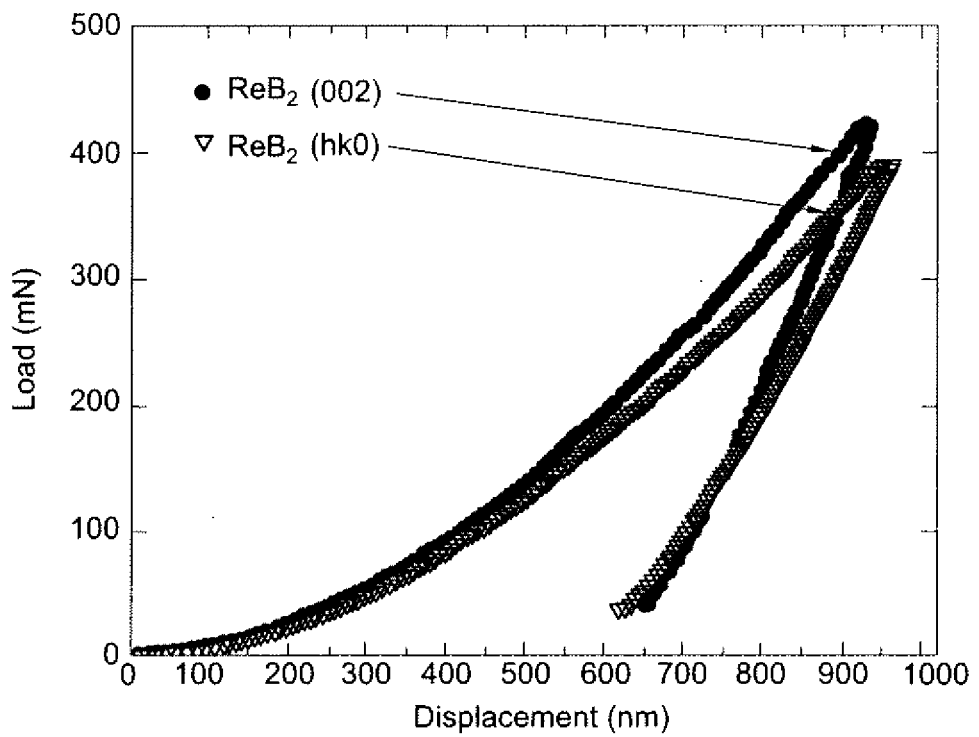
FIG. 12 illustrates load-displacement curves for rhenium diboride crystals, according to an embodiment of the invention.

FIG. 12 illustrates nano-indentation data collected for the rhenium diboride crystals, in the form of load-displacement curves. The data were collected from penetration of the Berkovich diamond nanoindenter about 200-800 nm beneath the sample surface. Once again, indentation measurements were carried out on the two perpendicular planes: (002) and (hk0) planes. The hardness measured along the (002) plane is about 36.4±0.2 GPa, while the hardness of the (hk0) plane is about 7 percent smaller with a value of about 34.0±1.3 GPa. The difference in hardness between the perpendicular planes for the nano-indentation data is in substantial agreement with the Vickers micro-indentation anisotropy described above.

Note that the low load micro- and nano-hardness data for the rhenium diboride crystals are lower than the values for arc-melted, polycrystalline rhenium diboride previously noted in Examples 1 and 2. Part of the decrease in hardness can be attributed to the boron-deficient structure of the flux-grown crystals. Additionally, the smaller lattice parameters noted above indicate a higher vacancy of boron atoms compared to arc-melted rhenium diboride. A 7.25 percent reduction in the number of boron atoms in the crystals (1.85/2.00) can reduce the extent of covalent bonding between the rhenium and boron atoms, and can lower the measured hardness values. Furthermore, single crystal samples tend to have lower hardness than polycrystalline samples because of grain boundaries in the latter, which can inhibit crack propagation and, therefore, increase hardness.

The higher hardness of the (002) plane compared to the (hk0) plane is expected to be related to the anisotropy of the Young's moduli of specific crystallographic directions. To confirm this relationship, the nano-indentation data were used to calculate elastic moduli. The theoretically calculated Poisson's ratio value of $\nu=0.18$ was used for rhenium diboride, in addition to the values of $\nu=0.07$ and $E=1140$ GPa for diamond. An indentation modulus of about 675±7 GPa for the basal plane of rhenium diboride was calculated over the specified range of about 200-800 nm, while the corresponding value for the perpendicular plane is about 510±13 GPa. The anisotropy present in the indentation moduli is in substantial agreement with both the nano- and micro-indentation hardness values, with the c axis possessing a higher hardness and greater indentation modulus than the (hk0) plane.

Determination of the elastic moduli by nano-indentation is based on contact mechanics for elastically isotropic materials. As a result, the indentation moduli calculated here are expected to differ from the Young's modulus because of the anisotropy in the layered lattice of rhenium diboride. The Young's modulus in the direction of the indentation is expected to dominate the elastic response; however, the indentation modulus can also be partially dependent on the other elastic constants. Therefore, the elastic anisotropy present in rhenium diboride crystals measured by nano-indentation can be reconciled with the elastic constants determined by first-principle calculations. The calculated elastic stiffness constants $C_{11}$ and $C_{33}$, which are also substantially anisotropic, measure the resistance to linear compression along the a and c axes, respectively. The constant for the c axis, namely $C_{33}$, has the largest value of about 1100 GPa, which results in the higher indentation modulus along this direction. The elastic moduli differ by about 25 percent compared to about 6 percent for the hardness values for the (002) and (hk0) planes. The ratio of the linear compressibility coefficients for the c and a axes can be calculated using equation (5):

$$k_c/k_\alpha = (C_{11}+C_{12}-2C_{13})/(C_{33}-C_{13}) \quad (5)$$

which is indicative of the degree of compressional anisotropy, with unity indicating an isotropic material. Similarly, the shear anisotropy ratio can be calculated using equation (6):

$$A = 2C_{44}/(C_{11}-C_{12}) \quad (6)$$

Rhenium diboride has calculated values of $k_c/k_\alpha$ of about 0.56 and A of about 1.06. These values indicate that elastic compression is more anisotropic than shear compression.

Because hardness is more correlated with shear strength than compressive strength, hardness is expected to be more isotropic than the elastic modulus. The greater degree of anisotropy present for indentation moduli compared to hardness indicates different mechanisms giving rise to elastic and plastic deformation and suggests that mechanical anisotropy can be reduced in the presence of plastic deformation.

Figure 13:
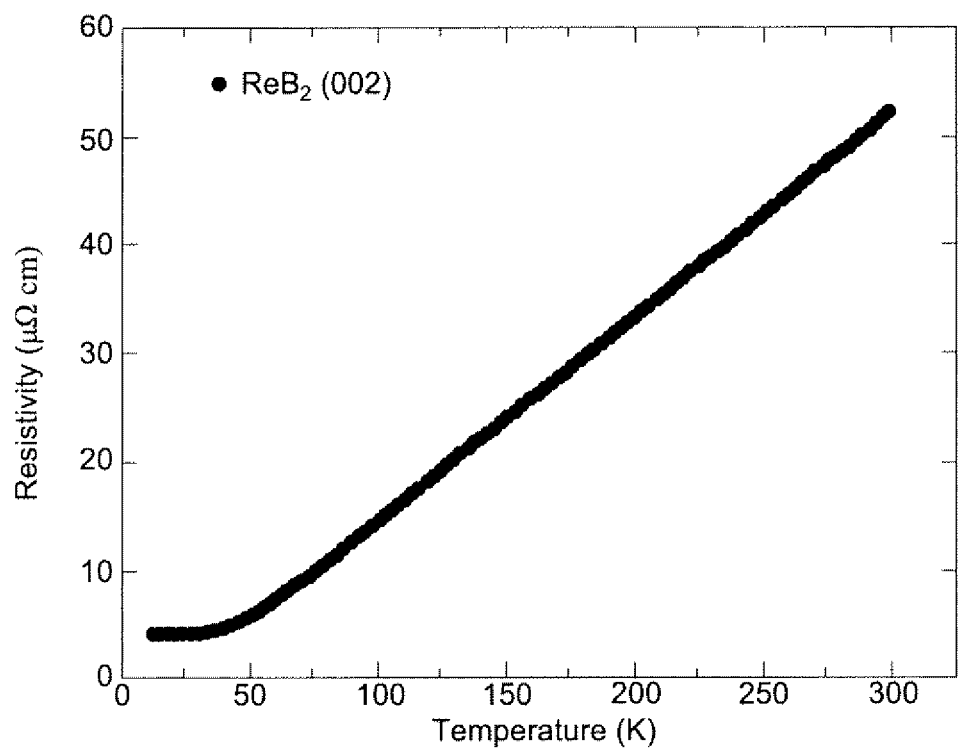
FIG. 13 illustrates electrical resistivity of rhenium diboride crystals plotted as a function of temperature, according to an embodiment of the invention.

In-plane electrical resistivity measurements performed on rhenium diboride crystals are illustrated in FIG. 13. Rhenium diboride was observed to have metallic conductivity, as its conductivity increases with decreasing temperature. A room temperature resistivity of about 45±15 μΩ·cm (300K) was measured, and impurity scattering accounts for a residual resistivity of about 3.5(1) μΩ·cm and a residual resistivity ratio of about 13. These results indicate that rhenium diboride is metallic with a non-zero density of states at the Fermi level due to overlap of 2p orbitals of boron with 5d orbitals of rhenium. Magnetic susceptibility measurements indicate the substantial absence of superconductivity down to about 2.0 K. Rhenium diboride crystals were observed to be paramagnetic with a Curie-tail at low temperatures.

Figure 14:
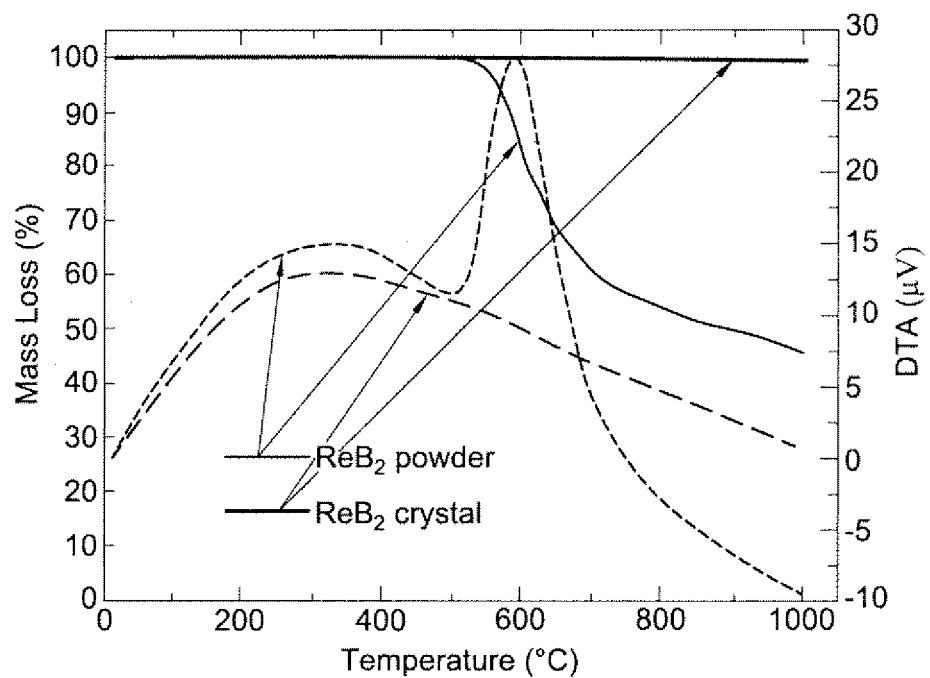
FIG. 14 illustrates mass loss as a function of temperature for a flux-grown rhenium diboride crystal and rhenium diboride powder synthesized via an elemental solid-state reaction, according to an embodiment of the invention.

Thermogravimetric data are illustrated in FIG. 14 for a flux-grown rhenium diboride crystal weighing about 21.95 mg and about 14.5 mg of rhenium diboride (nominal composition) powder synthesized via an elemental solid-state reaction. Upon heating in dry air, the rhenium diboride powder exhibits a very slight drop in mass at about 100° C., corresponding to the loss of absorbed water. At about 600° C., a large exothermic peak presents itself in the Differential Thermal Analysis ("DTA") curve as the powder begins to lose a greater portion of its mass. The mass loss continues until the completion of the run, totaling over about 50 percent of the original mass. Given that boron forms about 10 percent by mass of rhenium diboride, the change in weight can be attributed primarily to the loss of rhenium by the formation of volatile $ReO_3$ plus some loss of boron by the formation of $B_2O_3$. Initially, the rhenium diboride crystal responds similarly to heating in air, with a small drop in mass at about 100° C. However, no further change was detected until about 800° C., when the crystal loses a small percentage of its mass. Note that if the flux-grown crystal is heated at a slower rate of about 2° C./min up to about 1000° C., the mass loss increases accordingly, totaling about 1.5 percent of the original weight.

Visual inspection of the rhenium diboride crystal after heating indicates the presence of a glassy coating. Sonication in methanol removed the coating and restored the crystal to its previously lustrous appearance. The enhanced stability of the rhenium diboride crystal can be attributed to the leaching of boron from the crystal lattice. The boron then reacts with atmospheric oxygen to form a protective surface coating of $B_2O_3$, which is soluble in methanol and can significantly lower the rate at which further oxidation can occur. The resistance of rhenium diboride crystals to thermal degradation can present advantages for a variety of industrial applications.

Example 4

Synthesis and Characterization of Rhenium Diboride

Polycrystalline rhenium diboride was synthesized by SPS. In particular, a rhenium diboride powder sample was synthesized from a stoichiometric reaction between rhenium metal and amorphous boron under vacuum in a resistively heated furnace. After confirming the purity of the sample by powder X-ray diffraction, an excess of boron (about 7.5 atomic percent) was mixed into the sample. The powder was loaded into a graphite die lined with graphite foil, with an inner diameter of about 10 mm. Sintering was carried out at about 1650° C. and about 50 MPa for a holding time of about 2 min in vacuum (about $6\times10^{-2}$ Pa), with a heating rate of about 300° C. min$^{-1}$. The resulting rhenium diboride pellet or powder compact was about 10 mm in diameter and about 2 mm in thickness, and included a small amount of $Re_7B_3$ as an impurity as determined by powder X-ray diffraction measurements. The pellet was then cut and polished using diamond films with progressively finer grits, reaching a minimum of about 0.5 μm diamond particles in order to provide a suitable surface for elastic moduli measurements. A final density of about 10.92 g cm$^{-3}$ was determined using helium pycnometry.

Figure 15:
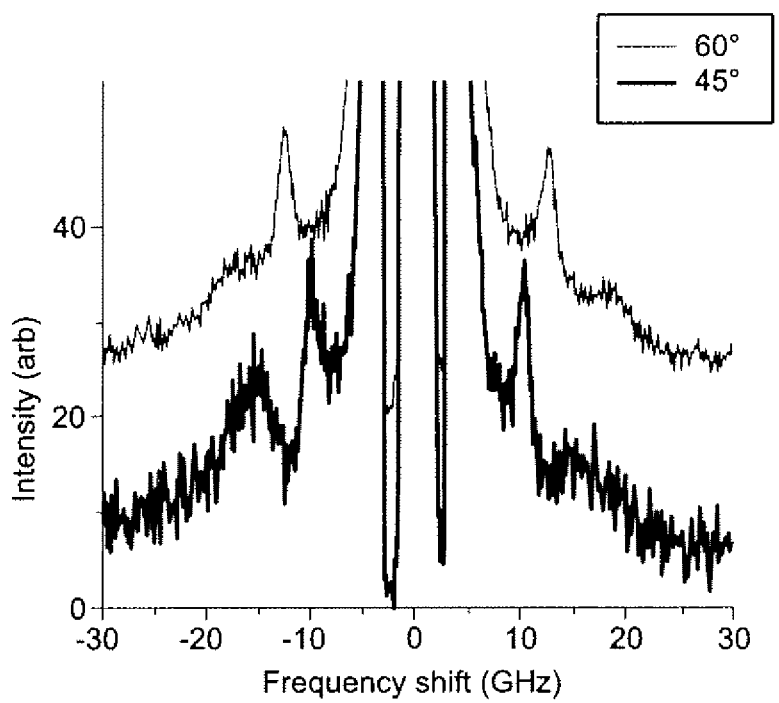
FIG. 15 illustrates Brillouin spectra of rhenium diboride, according to an embodiment of the invention.

Surface Brillouin Spectroscopy ("SBS"), which is a measurement technique based on the inelastic scattering of light, was used to characterize the shear modulus of the powder compact sample. In particular, a diode pumped laser (Coherent Verdi-2) with λ=532.1 nm light was focused on the sample surface, and a six-pass tandem Fabry-Perot interferometer (Sandercock model) was used for the spectral measurements. Brillouin spectra were measured in back-scattering geometry. Typical Brillouin spectra of the sample are illustrated in FIG. 15. The strongest symmetric peaks are related to inelastic scattering of photons on surface acoustic Rayleigh wave phonons and provide the Rayleigh wave velocity $V_{RW}$ through equation (7):

$$V_{RW}=\lambda v/(2\sin\theta) \quad (7).$$

where v is the Brillouin shift associated with the peak position of the strongest symmetric peaks, and θ is the scattering angle. Equation (7) can also be used to estimate the longitudinal sound velocity $V_L$ in the sample using the weaker Brillouin peaks at higher frequencies that result from the propagation of the longitudinal lateral leaky wave in the bulk material. Each spectrum, which included the sum of individual spectra collected for about one hour, was accumulated for about 10 hours to about 20 hours in total, in order to improve a signal-to-noise ratio of the Brillouin peaks associated with the longitudinal lateral leaky wave in the individual spectra.

Given the longitudinal velocity $V_L$ and the Rayleigh wave velocity $V_{RW}$, the shear velocity of polycrystalline rhenium diboride was calculated by numerically solving a Rayleigh dispersion equation for surface acoustic waves in isotropic half-space given by equation (8):

$$p^6-8p^4+8(3-2q^2)p^2-16(1-q^2)=0 \quad (8)$$

where $V_S$ is the shear velocity, $p=V_{RW}/V_S$, and $q=V_S/V_L$. The shear modulus G is then given by equation (9):

$$G=\rho V_S^2 \quad (9)$$

where ρ is the density of the sample. Thus, by using $V_S$=4.5(1) km sec$^{-1}$, which is the root of the Rayleigh dispersion equation, and ρ=10.92 g cm$^{-3}$, the value of the shear modulus G for the polycrystalline sample is about 223 (11) GPa.

Preliminary SBS measurements on a single crystal of rhenium diboride indicate that $V_{RW}$ in the ab plane is higher than $V_{RW}$ of the polycrystalline sample by about 400 m sec$^{-1}$. Accordingly, the shear modulus of the single crystal is expected to be even higher than the shear modulus of the polycrystalline sample set forth above. With a shear modulus of about 223 GPa, the polycrystalline rhenium diboride sample is comparable to cubic $BC_2N$, the second hardest bulk material after diamond, which has a shear modulus of about 238 GPa as determined by Brillouin spectroscopy measurements. Furthermore, nanostructured, superhard composites of $B_6O$—$B_4C$ prepared under high pressure possess a shear modulus of about 202 GPa. Thus, the polycrystalline rhenium diboride sample, which is less than about 90 percent dense and includes trace impurities of $Re_7B_3$, possesses a shear modulus comparable to other superhard materials. Given the correlation between hardness and shear modulus, it is expected that hardness values for rhenium diboride are also comparable to other superhard materials.

Example 5

Synthesis and Characterization of Rhenium Diboride

Rhenium diboride powder compacts were synthesized in a two-operation process. Initially, polycrystalline rhenium diboride was synthesized as loose powders. Subsequently, the powders were densified into a form compatible with indentation testing.

In accordance with powder synthesis, a total mass of about 2.5 g of rhenium powder (−325 Mesh, 99.99 percent, Rhenium Alloys, Inc.) and boron powder (≦1 μm, 99.9 percent, Cerac) were mixed together in a Re:B molar ratio of about 1:2, pressed into a pellet in a Carver press using about 10 metric tons of force, and sealed under vacuum in a quartz tube. The tube was then placed in a resistively heated muffle furnace and allowed to react for about 72 hours at about 750° C. The samples were then cooled to room temperature at a rate of about 100° C./hr.

Polycrystalline rhenium diboride can be synthesized from rhenium and boron powder in as little as about 48 hours at about 1000° C. Based on experiments varying the heating time, it was deduced that, after the product forms, the remaining time in the furnace can lead to grain coarsening, which can convert an initial nanocrystalline product into a microcrystalline product. Accordingly, by heating samples at lower temperatures for shorter time periods, grain growth can be inhibited to substantially maintain initially formed nanocrystallites. Using different reaction times and temperatures, it was determined that both $ReB_2$ and $Re_7B_3$ begin to form at temperatures as low as about 600° C. from a 1:2 mixture of rhenium and boron, thereby allowing optimization of a reaction profile to generate a phase pure product with small-sized crystallites.

Figure 16:
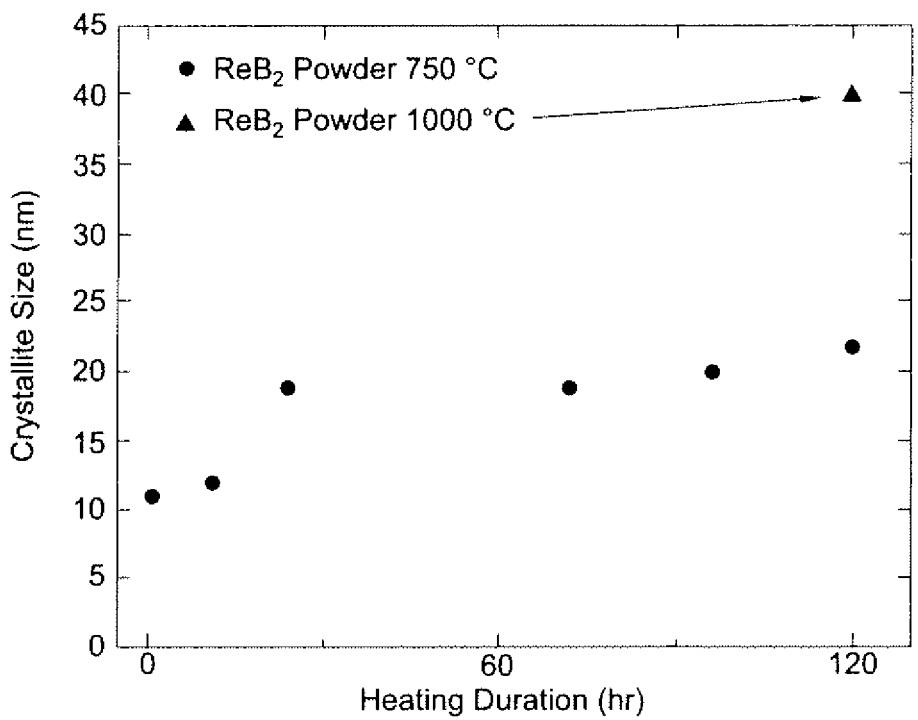
FIG. 16 illustrates a plot of crystallite size of rhenium diboride as a function of reaction time, according to an embodiment of the invention.

A desirable reaction temperature was determined to be about 750° C., which produced substantially phase pure $ReB_2$ with small-sized crystallites. A plot of crystallite size as a function of reaction time is illustrated in FIG. 16. Crystallite sizes were determined by applying the Scherrer equation to X-ray diffraction patterns. Referring to FIG. 16, the smallest crystallite size of about 11 nm was obtained after about 1 hour at about 750° C.; however, the sample included $Re_7B_3$. Increasing the reaction time to about 12 hours resulted in limited crystallite growth and a slight purification of the sample. The crystallite size increases to about 19 nm when the reaction time is increased to about 24 hours. Longer durations of about 72 hours, about 96 hours, and about 120 hours reduced the presence of $Re_7B_3$, and had little effect on the crystallite size, which increased to an average size of about 22 nm. Based on FIG. 16, a maximum crystallite size is expected to be temperature dependent, with about 20 nm being an upper limit for reactions at about 750° C. FIG. 16 also illustrates one data point corresponding to a crystallite size of about 40 nm for a 5 day reaction at about 1000° C., further indicating that a maximum crystallite size is temperature dependent.

In accordance with powder densification, powders were manually mixed together and consolidated using SPS(SPS-1030, Simitomo Coal Mining Co. Ltd., Japan). The powders were placed into graphite dies lined with graphite foil and heated for about 2 minutes at various temperatures between about 1300° C. and about 1900° C. under argon gas and about 50 MPa of applied pressure with a heating and cooling rate of about 400° C./min. Higher temperatures at about 1900° C. were observed to result in sample melting. In order to avoid or reduce sample melting, subsequent sintering was carried out at temperatures ranging from about 1300° C. to about 1650° C. During the sintering process, some of the boron can be lost due to volatilization, which can result in rhenium-rich regions within a compact that structurally reorganize to compensate for the lack of boron and form $Re_7B_3$. As a preventative measure, non-stoichiometric powders were synthesized including progressively higher concentrations of boron, beginning with an excess of about 2.5 atomic percent and ending with about 12.5 atomic percent. Based on the powder diffraction patterns of sintered compacts, an excess of about 10 atomic percent of boron resulted in particularly pure samples of rhenium diboride.

X-ray diffraction patterns were collected on a PANalytical XPert Pro powder diffractometer with Cu $K_\alpha$ radiation ($\lambda=1.5418$ Å) and a Ni filter to absorb the $K_\beta$ radiation. The synthesized powders were characterized as formed. X-ray diffraction patterns of compacted powders were collected on cross-sectioned, polished specimens encased in epoxy using a rotating sample stage. Electron micrograph images were collected using a Nova 600 Field Emission Gun Scanning Electron Microscope (FEI Company). Density measurements were carried out using helium pycnometry (Micromeritics Instrument Corp.). For indentation measurements, samples were encased in a slow-curing epoxy resin and initially polished with silicon carbide abrasive paper. Diamond films (30 μm, 15 μm, 6 μm, 3 μm, and 1 μm particle sizes) were used for fine polishing in order to obtain a mirror finish. Micro-indentation measurements were carried out on a Vickers diamond microindenter (Buehler Company). A minimum of 10 indentations were made at each load, beginning with about 4.9 N and ending with about 0.49 N to ascertain the load-dependent hardness. The indentations were measured using an Axiotech 100 reflected light microscope (Zeiss) under 500× magnification. Digital images were taken using an attached AxioCam MRc color CCD camera.

Figure 17:
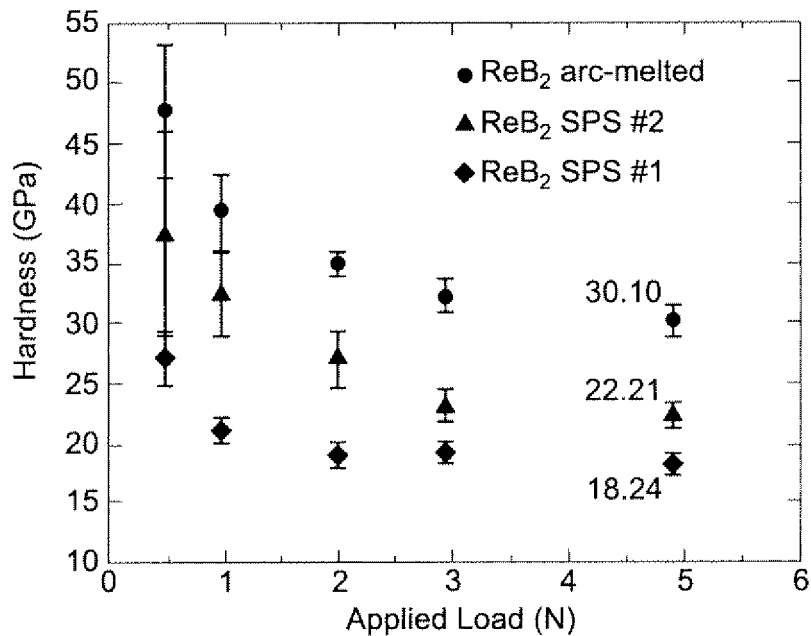
FIG. 17 illustrates Vickers hardness $H_V$ plotted as a function of applied load for Spark Plasma Sintering samples of rhenium diboride and arc-melted rhenium diboride, according to an embodiment of the invention.

Vickers hardness $H_V$ was determined by taking an average value for diagonals of a residual indentation and solving for hardness according to equation (1) previously noted in Example 1. The hardness data of stoichiometric SPS samples of rhenium diboride are illustrated in FIG. 17, along with the hardness data for arc-melted rhenium diboride for comparison. Both SPS samples exhibited the indentation size effect and exhibited hardness values below that of the arc-melted rhenium diboride. The high load values are about 18.2 GPa and about 22.2 GPa for a first sample (SPS #1) and a second sample (SPS #2), respectively. The reduced hardness is expected to result from two factors. The SPS samples included $Re_7B_3$ as an impurity, and the lower bond covalency resulting from the lower boron content of $Re_7B_3$ is expected to lower the hardness of the samples. Additionally, the SPS samples were not 100 percent dense, but rather had densities of about 85 percent and about 91 percent for SPS #1 and SPS #2, respectively. Note that the denser sample (SPS #2) exhibited a higher hardness at all of the tested loads, which indicated a correlation between density and mechanical characteristics.

A series of non-stoichiometric samples using a specified molar ratio of rhenium to boron of about 1:2.2 (about 10 atomic percent excess of boron) were synthesized. This ratio was determined to yield particularly pure compacts after SPS.

Figure 18:
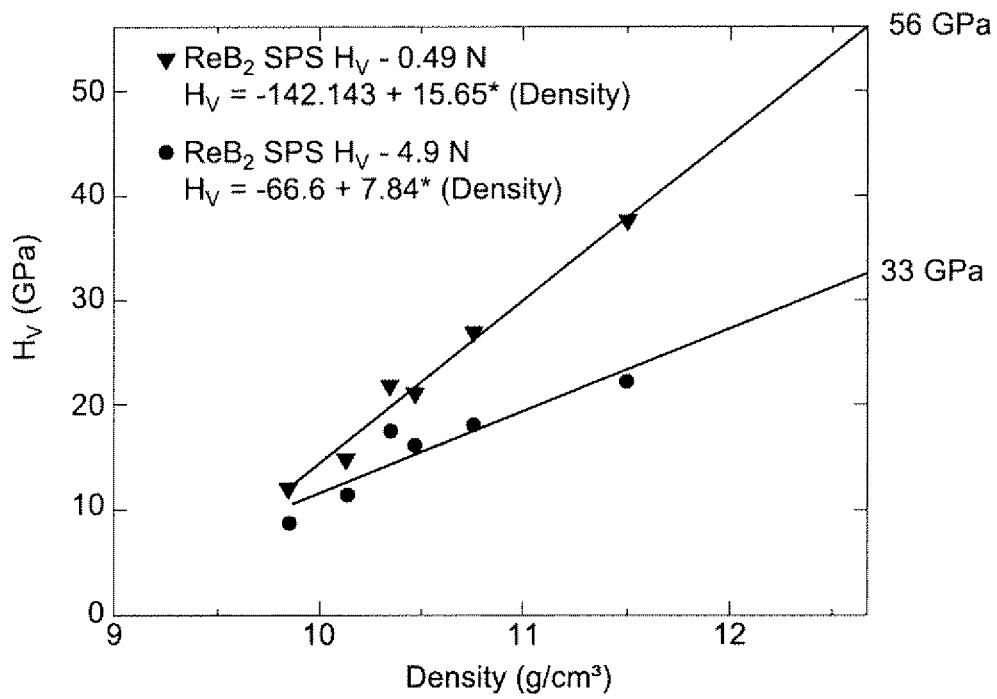
FIG. 18 illustrates Vickers hardness $H_V$ plotted as a function of density for Spark Plasma Sintering samples of rhenium diboride, according to an embodiment of the invention.

Effective reaction profiles were examined based on the Vickers hardness and a final density of the samples using helium pycnometry. The samples including excess boron were observed to have lower densities and correspondingly lower hardness values compared to SPS #2. For example, a sample of $ReB_{2.2}$ sintered at about 1600° C. for about 2 minutes was about 84 percent dense upon completion of the run, whereas sintering at about 1550° C. yielded a final density of about 90 percent. The high porosity of the non-stoichiometric samples is expected to affect their hardness, with about 10 percent reduction in density (from about 91 percent to about 80 percent) resulting in about 50 percent reduction in hardness (from about 22.2 GPa to about 11.5 GPa). The hardness values of the samples follow a linear correlation with density, as illustrated in FIG. 18. Extrapolating the values with a linear fit results in a high load hardness of about 32 GPa and a low load hardness of about 56 GPa for a 100 percent dense powder compact. In order to obtain such densities, it is expected that a sintering temperature between about 1800° C. and about 1900° C. can be desirable.

Example 6

Synthesis and Characterization of Rhenium Diboride

Rhenium diboride was synthesized using a Tri-arc technique. In particular, a rhenium diboride boule was formed in a modified Tri-arc crystal growing equipment. A crystal was pulled at about 25 mm/hr with hearth (120 rpm) and Mo seed rod (27 rpm) counter-rotating. The initial material was solidified from a previously arc-melted ingot with a composition of $ReB_{2.05}$. The extra 0.05 moles of boron was included to compensate for boron evaporation. A final density of about 12.51 g cm$^{-3}$ (about 98.7 percent of full density) was obtained for the Tri-arc sample using Archimedes' principle and a water immersion technique. Powder diffraction measurements on the Tri-arc sample indicated a highly oriented, polycrystalline sample with an average crystallite size of about 250(1) Å. The highly oriented nature of the sample indicates that polycrystallinity is likely caused by twinning that occurred during the growth process, such as from 60° rotations in the ab plane.

While the invention has been described with reference to the specific embodiments thereof, it should be understood by those skilled in the art that various changes may be made and equivalents may be substituted without departing from the true spirit and scope of the invention as defined by the appended claims. In addition, many modifications may be made to adapt a particular situation, material, composition of matter, method, or process to the objective, spirit and scope of the invention. All such modifications are intended to be within the scope of the claims appended hereto. In particular, while the methods disclosed herein have been described with reference to particular operations performed in a particular order, it will be understood that these operations may be combined, sub-divided, or re-ordered to form an equivalent method without departing from the teachings of the invention. Accordingly, unless specifically indicated herein, the order and grouping of the operations are not limitations of the invention.

What is claimed is:

1. A tool for abrading, cutting, or polishing, comprising:
   a portion including a rhenium boride compound having the formula:

$$Re_yM'_{y'}B_x$$

wherein M' is selected from iridium, rhodium, ruthenium, tungsten, and molybdenum, a sum of y and y' is 1, x is in the range of 1.7 to 2.3, and the rhenium boride compound is polycrystalline.

2. The tool of claim 1, wherein x is in the range of 1.85 to 2, and y is in the range of 0.01 to 0.99.

3. The tool of claim 1, wherein y is in the range of 0.01 to 0.99.

4. A tool for abrading, cutting, or polishing, comprising:
   a portion including a rhenium boride compound having the formula:

$$Re_yM'_{y'}M''_{y''}B_x$$

wherein M' and M'' are selected from transition metals other than rhenium, at least one of M' and M'' is selected from ruthenium, tungsten, and molybdenum, a sum of y, y', and y'' is 1, and x is in the range of 1.7 to 2.3.

5. The tool of claim 4, wherein x is in the range of 1.85 to 2, and the rhenium boride compound is polycrystalline.

6. The tool of claim 4, wherein y is in the range of 0.01 to 0.99, and y' is greater than 0.

* * * * *